United States Patent [19]
Lee et al.

[11] Patent Number: 6,119,979
[45] Date of Patent: Sep. 19, 2000

[54] CYCLICAL THERMAL MANAGEMENT SYSTEM

[75] Inventors: Yee-Chun Lee, Cabin John, Md.; Elena A. Novakovskaia, Springfield, Va.; Sam M.-S. Chen, Silver Spring, Md.; Brandon G. Mason, Pocomoke, Md.; Valentine R. Connell, Pasadena, Md.

[73] Assignee: Sky Station International, Inc., Washington, D.C.

[21] Appl. No.: 08/929,889

[22] Filed: Sep. 15, 1997

[51] Int. Cl.[7] .................................................. B64B 1/62
[52] U.S. Cl. ................................. 244/97; 244/96; 244/98; 244/61
[58] Field of Search .................................. 244/95, 96, 97, 244/98, 61; 55/385.1, 385.3; 205/637, 633

[56] References Cited

U.S. PATENT DOCUMENTS

| | | |
|---|---|---|
| 1,549,061 | 8/1925 | Chenu . |
| 1,802,586 | 4/1931 | Stokes . |
| 2,078,532 | 4/1937 | Fischer . |
| 3,174,705 | 3/1965 | Schiff et al. . |
| 3,456,903 | 7/1969 | Papst . |
| 3,461,835 | 8/1969 | Cockbill et al. . |
| 3,897,032 | 7/1975 | Papst . |
| 4,012,016 | 3/1977 | Davenport . |
| 4,215,834 | 8/1980 | Dunlap . |
| 4,262,864 | 4/1981 | Eshoo . |
| 4,361,297 | 11/1982 | Pommereau et al. . |
| 4,364,532 | 12/1982 | Stark . |
| 4,773,617 | 9/1988 | McCampbell . |
| 4,982,915 | 1/1991 | Brotz . |
| 4,986,494 | 1/1991 | Tockert . |
| 5,090,637 | 2/1992 | Haunschild . |
| 5,104,059 | 4/1992 | Rand et al. . |
| 5,348,254 | 9/1994 | Nakada . |
| 5,518,205 | 5/1996 | Wurst et al. . |
| 5,890,676 | 4/1999 | Coleman et al. .......................... 244/30 |

FOREIGN PATENT DOCUMENTS

| | | |
|---|---|---|
| 31981 | of 0000 | European Pat. Off. . |
| 524872 | 1/1993 | European Pat. Off. ................. 244/96 |
| 2375089 | of 0000 | France . |
| 3833947 | 4/1990 | Germany ................................ 244/96 |
| 426740 | of 0000 | Japan . |
| 5435995 | of 0000 | Japan . |
| 58-172201 | 10/1983 | Japan ..................................... 205/637 |
| 1740250 | of 0000 | Russian Federation . |
| WO 95/04407 | 2/1995 | WIPO . |

*Primary Examiner*—Peter M. Poon
*Assistant Examiner*—Tien Dinh
*Attorney, Agent, or Firm*—Breneman & Georges

[57] ABSTRACT

A cyclical thermal management system is provided for responding to diurnal heating and nocturnal cooling cycles to maintain a high altitude platform in a geostatic position for long periods of time. The novel cyclical thermal management system utilizes solar energy collection devices to collect solar energy which is stored and utilized to operate physical and chemical exothermic processes for heating the lifting gas of the novel high altitude platform at night and to operate physical and chemical processes during the day for transferring the heat of the lifting gas to maintain a particular geostatic position. The cyclical thermal management system utilizes a recyclable energy storage material which is utilized in not only the cyclical thermal management of heat diurnally but also to provide for seasonal and longitudinal variation by increasing or decreasing the volume of lifting gas or by increasing or decreasing the amount of the energy storage material. The energy storage material also provides for the replacement of lost lifting gas. The novel cyclical thermal management system controls altitude and pitch attitude so that horizontal stabilizers and elevators are not necessary to maintain or control pitch and therefore become optional. The novel cyclical thermal management system is combined with other active systems for reducing the amount of heat processing through physical and chemical processes to maintain a geostatic position.

75 Claims, 15 Drawing Sheets

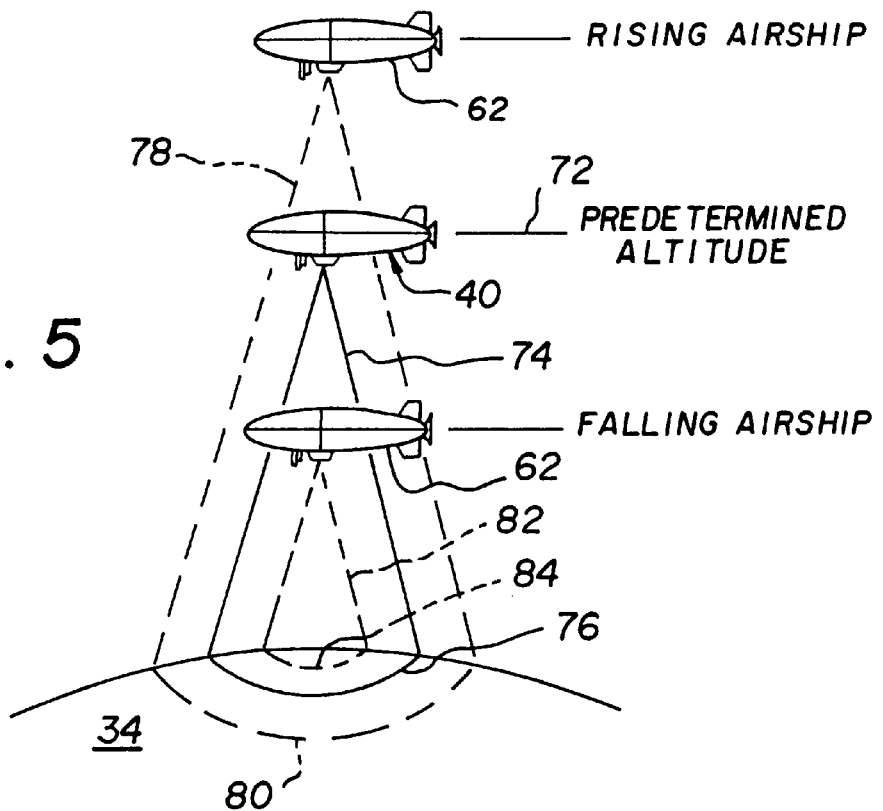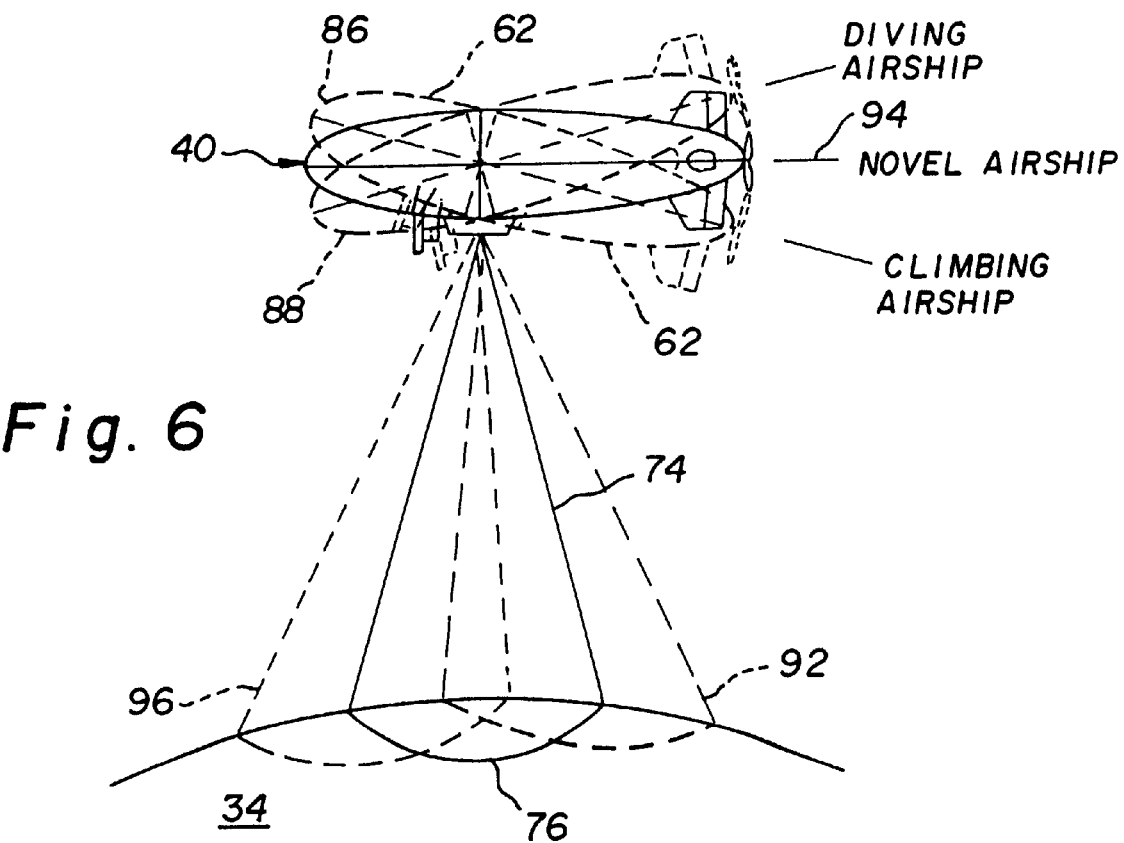

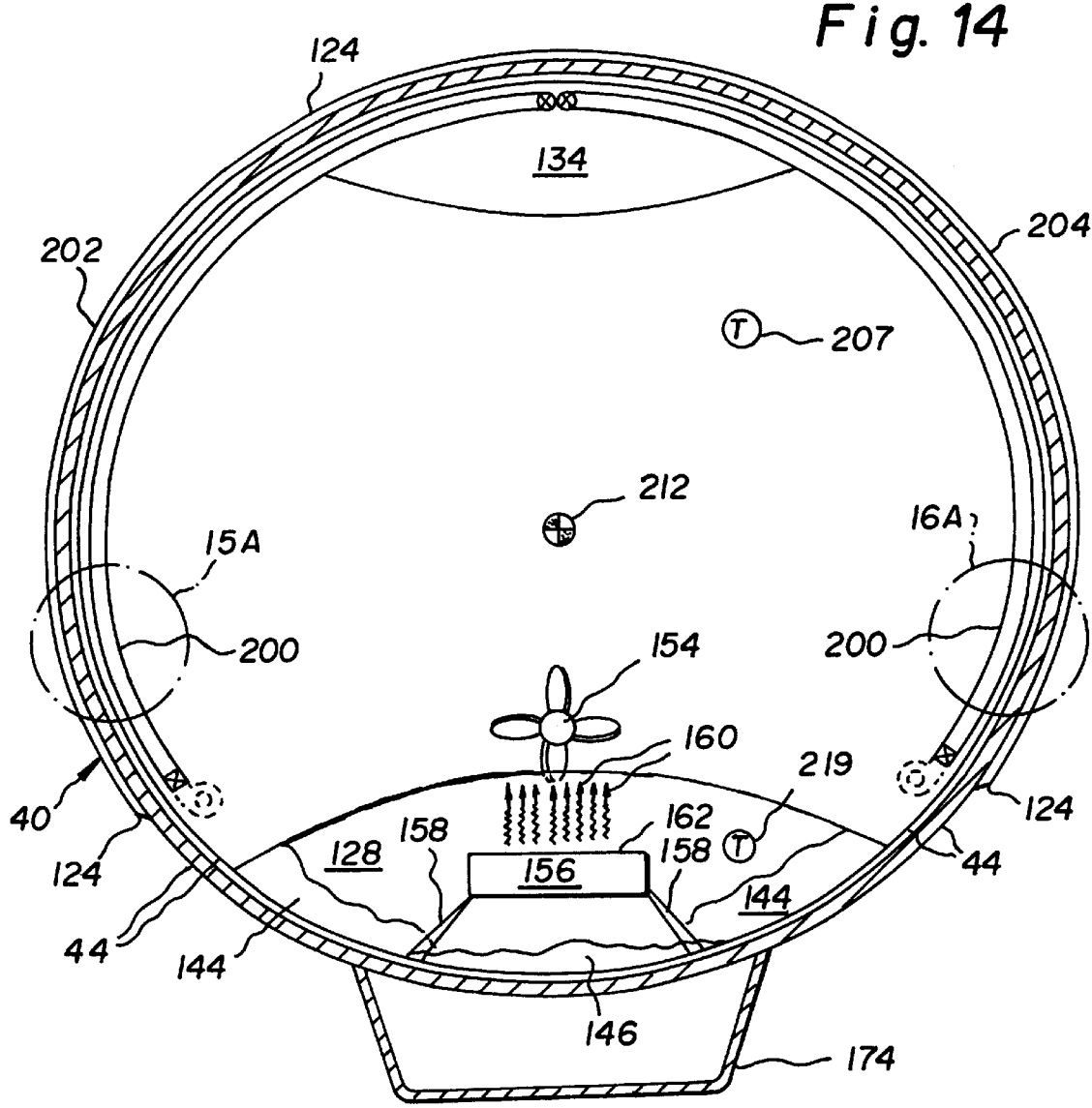
Fig. 14
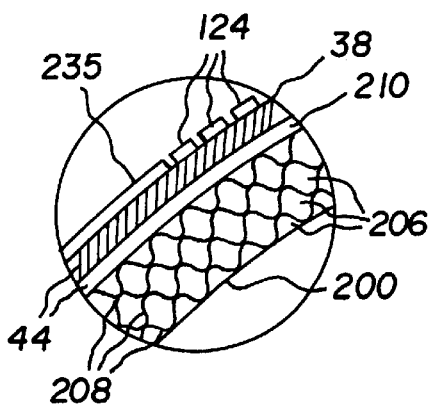
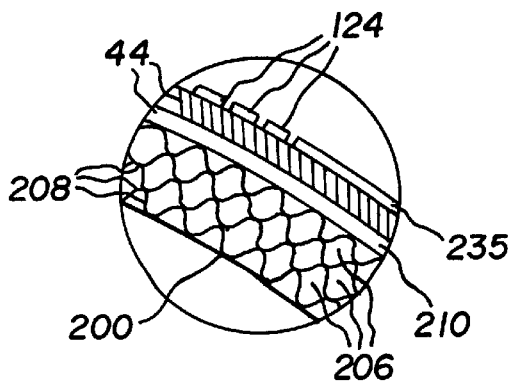
Fig. 15    Fig. 16

CYCLICAL THERMAL MANAGEMENT SYSTEM

BACKGROUND OF THE INVENTION

1. Field of the Invention

The invention pertains to a cyclical thermal management system for maintaining a high altitude platform within a particular altitude range. More particularly, the invention pertains to a long duration, energy efficient, cyclical thermal management system for maintaining high altitude vehicles at a particular altitude and pitch attitude by cyclically manipulating the temperature of one or more of the lifting gases or ballast components in the high altitude platform in response to the effects of diurnal heating and nocturnal cooling cycles and seasonal variations in daylight cycles, the solar flux, and the albedo flux from earth.

The novel cyclical system of the invention responds to the sun's cyclical heating and nocturnal cooling of lifting gases in geostationary high altitude platforms by a corresponding cyclical regulation or manipulation of the temperature of the lifting gas or ballast components and hence buoyancy of the platform to maintain the platform within a particular altitude range and at a particular pitch attitude. The cyclical thermal regulation or manipulation of the lifting gas or ballast components involves not only a daily cycle responsive to the heating and cooling of the lifting gas by the sun, but also the seasonal cyclical pattern of the climate of the particular geostationary location above the surface of the earth.

The cyclical regulation or manipulation of the lifting gas is achieved by processing energy by utilizing cyclical heating and cooling physical actions and chemical reactions alone or together with the chemical or mechanical processing of a portion of the lifting gas or ballast components to maintain a particular altitude or altitude range as well as the potential for future replenishment and storage of lifting gas in a non buoyant ballast compound. The cyclical processing of heat alone or together with the processing of the lifting gas or ballast components is the basic part of the novel active system of the invention.

Buoyancy control in accordance with the best mode of the invention is achieved by a combination of active and passive systems wherein the passive system is designed to reduce the volume of material processed or energy transfer manipulations required from the active system. The combination of a cyclical active system with the passive system also reduces energy and power requirements for maintaining a geostatic position. The related prior art has used the term "geostationary" to describe a predetermined horizontal position but not maintaining a predetermined altitude and pitch attitude. As used herein the term "geostatic" will be used to refer not only to a predetermined horizontal position but also a predetermined altitude and pitch attitude of the novel high altitude platform.

The cyclical active system involves a diurnal as well as a seasonal manipulation of the lifting gases or ballast components by either the conversion of a portion of the lifting gas into a material of less buoyancy as ballast and then later reconverting all or a portion of the material of less buoyancy back into a lifting gas or by an increase in the weight of the ballast component and then later decreasing the weight of the ballast component. For example, hydrogen and oxygen can be processed on a daily basis to provide physical and chemical exothermic reactions during the night to heat the lifting gas at night and provide water. Water produced at night is stored in a water ballonet where in freezing it stores energy in the form of latent and sensible heat which is used to help cool the lifting gas in the early morning before the water is reprocessed during the day to store the sun's energy for use in generating heat during the next night to control buoyancy. For seasonal variation water can be disassociated into hydrogen which is used as additional lifting gas during the winter and oxygen can be expelled into the stratosphere. In the summer oxygen can be reacquired from the stratosphere and recombined with the hydrogen lifting gas to produce water to reduce the volume of the lifting gases, increase the weight of the ballast components and increase the volume of recyclable energy storage materials available for heating and cooling processes to heat and cool the lifting gas.

The cyclical active system also involves a diurnal and seasonal manipulation of the temperature of the lifting gas utilizing heating and cooling physical processes and chemical reactions of the lifting gas or ballast component. The cyclical active system also includes a system for replenishing lifting gas lost through diffusion or the cyclical conversion and reconversion process or as may be required by seasonal variations for a particular geostatic location.

The cyclical active system also provides for the mechanical manipulation and regulation of the lift properties of the lifting gas by utilizing lifting gas circulation fans, shutters or louvers for shielding the lifting gas and variable heat conductance systems. The cyclical active system preferably also includes separately inflatable and deflatable layers for selectively varying the heat transmitted through the skin in relation to its relative position to the sun. These active systems are combined with various passive systems such as utilizing materials having desirable convective and radiative properties for various components including the utilization of heat and radiation reflective layers, a white coating on upper surfaces, no coating on the lower surfaces and materials having desirable convective and radiative properties for various components to reduce the volume of materials or the number of heat transfer manipulations required from the active system to maintain a geostatic position.

2. Description of Related Prior Art Including Information Disclosed Under 37 C.F.R. 1.97 and 37 C.F.R. 1.98

Typically high altitude platforms are specialized types of balloons, dirigibles and lightweight platforms that are maintained aloft with a buoyant gas. These specialized prior art stratospheric platforms have remained aloft only for short durations which is typically a few days and at best a few weeks. For purposes of greater utility such platforms need to be maintained at a predetermined position which requires engines or other propulsion systems to maintain the high altitude platform over a predetermined location on the earth as stratospheric winds are encountered.

Prior art platforms referred to as geostationary were not geostatic due to the extreme temperature variations between the day and night at high altitude which caused the heating and expansion of the lifting gas during the day resulting in altitude gain, increased skin pressure and increased rates of diffusion of the lifting gas through the skin as well as possible failure of the skin material. The problem of increasing altitude during the day if not corrected in the prior art by venting or engine power is cumulative since each increase in altitude results in further expansion of the lifting gas and further lift and further skin pressure due to the decreasing density of the ambient air at higher altitudes. At night the nocturnal cooling of the lifting gas results in decreased volume and pressure and decreased altitude which could cause the platform to crash to the earth.

The conventional prior art solutions to the diurnal heating and nocturnal cooling cycles included venting a portion of the lifting gas during the day to reduce lift in an effort to maintain altitude and the integrity of the skin and a dropping of ballast at night to maintain altitude. This process of venting and dropping of ballast was for a flight duration limited by the volume of lifting gas and ballast. Another conventional prior art solution is the utilization of superpressurization to maintain altitude. The superpressurization solution required a balloon to maintain a constant volume with high internal pressures of 15,000 to 20,000 p.s.i. which put additional stress on the skin material and components that hold the skin together as discussed in Rand, et al. U.S. Pat. No. 5,104,059.

The conventional prior art also could rely upon engines, elevators and wings to divert power to maintain a geostationary position as well as a particular altitude but at the expense of pitch attitude and large amounts of energy. The sacrifice of pitch attitude sacrifices utility due to the resulting inability to control the footprint or field of vision from the platform. The additional problem of sacrificing energy results in a sacrifice of flight duration. The problem with these prior art solutions is the geostatic position of the platform is limited by the amount of energy the platform can carry, store or obtain from the outside environment which is typically sunlight. The more power required to maintain position, altitude and pitch the shorter the flight duration.

The invention unlike the prior art maintains a geostatic position by cyclically processing temperature, lifting gases and ballast weight in response to the diurnal cycles and seasonal variations and when necessary replaces lifting gases lost through diffusion or conversion by varying the chemical composition of the lifting gas and/or ballast. The invention provides for the thermal treatment of the lifting gas utilizing solar energy to maintain a geostatic position and to control skin pressure and lifting gas density during the daily heating and nocturnal cooling cycles as well as seasonal variations to provide a long duration high altitude platform. The invention provides for not only an active system for cyclically manipulating the temperature of lifting gas and the chemical nature of the lifting gas or ballast utilizing solar energy but also provides for a passive system which cooperates with the active system to minimize the magnitude of the manipulations of the active system to maintain a geostatic position.

The related art is best described as geostationary high altitude long duration lighter-than-air platforms. High altitude refers to platforms capable of maintaining an altitude of 50,000 to 120,000 feet for prolonged periods of time and that are capable of maintaining a geostationary position with respect to a predetermined geographic area. Due to the different ambient temperature, pressure and atmospheric conditions in the stratosphere as opposed to the troposphere much of the prior art pertaining to dirigibles and balloons operating in the troposphere is not applicable to geostationary high altitude long duration lighter-than-air platforms.

The related high altitude long duration prior art recognizes the importance of staying aloft for prolonged periods of time in a predetermined geographic position. The geographic position is generally defined in terms of a horizontal position over a predetermined location and not in terms of a cyclical thermal management system for maintaining both horizontal position over a predetermined location and altitude as well as the pitch attitude and pitch angle of the high altitude platform. Wurst, et al. U.S. Pat. No. 5,518,205 provides a high altitude lighter-than-air vehicle that maneuvers during daylight hours to capture as much solar energy as possible during the day to operate the propellers, avionics and a gondola shifting mechanism. Excess energy is stored as electricity in batteries with the preferred method of energy storage being electrolysis or the conversion of water to hydrogen and oxygen gases that are stored in towed pontoons which are recombined into water at night to generate electricity at night. In Wurst, et al. U.S. Pat. No. 5,518,205 altitude control, trim and pitch angle control is provided by a combination of the forward wing, rearward wing and propellers. As a result Wurst, et al. U.S. Pat. No. 5,518,205 does not have a cyclical thermal management system to compensate for the daily heating and expansion of the lifting gas and the nocturnal cooling and resulting decreased lift and contraction of the lifting gas. Wurst, et al. U.S. Pat. No. 5,518,205 utilizes the typical prior art altitude, pitch angle and trim control management by utilizing the forward wing, rearward wing and propellers.

Related high altitude long duration lighter-than-air platforms having a buoyancy control system for compensating for loss of lift due to nocturnal cooling is Schiff, et al. U.S. Pat. No. 3,174,705. The lifting gas density maintaining device in Schiff, et al. U.S. Pat. No. 3,174,705 is a microwave electromagnetic radiation absorbing device for absorbing beamed microwave electromagnetic radiation to raise the temperature of the lifting gas at night to compensate for the nightly cooling and resulting decreased lift and contraction of the lifting gas. Schiff, et al. U.S. Pat. No. 3,174,705 does not provide a mechanism for reducing lift during the daylight hours to maintain altitude and pitch attitude nor does Schiff, et al. U.S. Pat. No. 3,174,705 provide for reducing thermal stress on the skin or the replenishment of lifting gas lost by diffusion through the skin of the high altitude platform. Schiff, et al. U.S. Pat. No. 3,174,705 as a result does not provide a cyclical thermal management system to compensate for daytime heating with seasonal variation or the replenishment of lost lift resulting from the loss of lifting gas for long duration applications. Schiff, et al. U.S. Pat. No. 3,174,705 also does not chemically process either ballast or lifting gas to reduce skin stress and to compensate for diurnal heating and nocturnal cooling.

Nakada U.S. Pat. No. 5,348,254 pertains to a high altitude long duration lighter-than-air platform which utilizes solar power during the day but then burns hydrogen lifting gas at night and replaces the loss of lift by utilizing exhaust heat from the engine and recovering water at night. Like Schiff, et al. U.S. Pat. No. 3,174,705, Nakada U.S. Pat. No. 5,348,254 does not have a cyclical thermal management system for reducing skin stress during the day and maintaining a particular altitude during the day. Nakada U.S. Pat. No. 5,348,254 also does not have a recyclable cyclical thermal management system to cyclically manage the lifting properties of the lifting gas during both the daytime heating and the night time cooling cycles and for the replenishment of lifting gas lost through diffusion during the day or lifting gas that is burned during the night.

Kokai No. 54-35995 pertains to a high altitude balloon carrying water which at altitude is converted by electrolysis into hydrogen and oxygen using a solar cell. The hydrogen is used to increase lift as the oxygen is discarded. This prior art increases buoyancy but does not cyclically process ballast and lifting gas to reduce skin stress and to compensate for diurnal heating and nocturnal cooling to provide a cyclical thermal management system to compensate for both daytime heating, nighttime cooling and seasonal variations to provide for a long duration high altitude thermal management system.

Other high altitude long duration related art includes Stark U.S. Pat. No. 4,364,532 which circulates cool ambient air around solar cells for cooling to increase the efficiency of the solar cell; Eshoo U.S. Pat. No. 4,262,864 which has opaque and transparent skin surface sides which are alternatively oriented toward the sun for controlling ascent and descent; and Tockert U.S. Pat. No. 4,986,494 which recognizes the high altitude problem caused by diurnal heating and the necessity of protecting the envelope skin from rupturing by the venting of the lifting gas and the nocturnal cooling and decreasing lift and the necessity of dropping ballast to maintain altitude. Tockert U.S. Pat. No. 4,986,494 solves these problems by employing a variable volume balloon with a transparent envelope with a thermal trapping hood. Tockert U.S. Pat. No. 4,986,494 does not employ a semi rigid dirigible having a substantially constant outer surface shape and does not have a cyclical thermal management system for manipulating the temperature of the lifting gas, volume of the lifting gas or the weight of the ballast component. The related prior art does not provide a cyclical thermal management system for reducing skin stress and compensating for diurnal heating and nocturnal cooling or for controlling pitch attitude and providing for the replenishment of lifting gas lost in daily or seasonal cycles that is necessary for providing a long duration high altitude application.

The relevant prior art also includes a variety of passive skin systems for controlling altitude. In Pommereau U.S. Pat. No. 4,361,297 and Sanyo Electric Co. Ltd. Japan Appl. No. 4-26740 the upper part of the skin is transparent while in Graner French 2375-089 a metal foil is disposed between layers to reduce leakage. In CNES EP-31-981 the lower part of the balloon is transparent. None of these references alone or together provides for a combination of an active and passive system for maintaining a geostatic position.

Related prior art pertaining to manned balloons and dirigibles operating in the troposphere are believed only tangentially relevant due to the extremely different conditions in the stratosphere resulting in differences in processing hydrogen, oxygen and water as well as the utilization of active and passive systems to provide for long duration flights. The helium purification system of Haunschild U.S. Pat. No. 5,090,637 for manned dirigibles and the burning of hydrogen and recovery of water as a by-product of combustion in Fischer U.S. Pat. No. 2,078,532 and Russian 1,740,250 or the chemical conversion of natural lifting gases in Papst U.S. Pat. No. 3,897,032 are different than the invention as the prior art does not provide for a cyclical thermal management system for stratospheric applications to solve the problem of altitude variations resulting from diurnal heating and nocturnal cooling. Similarly dirigibles having multiple envelopes or layers of skin such as McCampbell U.S. Pat. No. 4,773,617 and the utilization of steam and water vapor to control lift and trim in Papst U.S. Pat. No. 3,456,903 are not particularly pertinent to high altitude applications in the stratosphere. The physical properties of water, steam and their mechanical migration through layers of envelope skin material is very different in the stratosphere than in the troposphere.

SUMMARY OF THE INVENTION

The invention provides a cyclical thermal management system for use on stratospheric airships whose application requires they stay aloft in a geostatic position for many months or years. The invention cyclically processes the heat of the lifting gases in response to the heliocyclic stratospheric heating and combines both active and passive measures to control the temperature of the lifting gas and hence the buoyancy of an airship thus enabling it to maintain a constant altitude, pitch attitude and trim in spite of the diurnal heating and nocturnal cooling cycles. Unlike the prior art the duration of the novel high altitude platform in the stratosphere is not limited by the volume of fuel carried by the airship, the volume of lifting gas, the amount of ballast or the energy requirements of the system, but instead the durability of the envelope or skin materials to solar and UV degradation.

The invention does not require terrestrial fuels such as gasoline or diesel oil, nor does it require it to consume its own lifting gas such as hydrogen or methane. Carrying aloft an energy source that does not exist naturally in the stratosphere limits the duration of flight because the airship must land periodically to refuel. Similarly, the invention does not vent lifting gas nor drop non re-acquirable ballast to maintain a constant altitude because lifting gases and ballast materials do not exist naturally in the stratosphere and as a result cannot be replaced, which result in limited flight duration. The invention does not rely on beamed microwave energy from the earth because of questionable environmental consequences and the fact that many applications, such as air traffic control, traffic monitoring or telecommunications, would require the microwave transmission stations to be built in the least feasible areas such as in the heart of major cities or close to the airport.

The invention in the preferred embodiment provides for the utilization of the solar power of the sun, which is an abundant and renewable energy source that is predictably available in the stratosphere as well as albedo flux energy which is always available night and day. Unlike in the troposphere, solar energy is predictably available in the stratosphere unimpeded by moisture or water vapor or clouds. The predictable availability of the sun as well as its predictable seasonal variation in the stratosphere allows the novel cyclical thermal management system to be just as predictably cycled by starting and stopping cyclical heating and cooling processes necessary to counteract the action of the sun in heating and increasing the buoyancy of the lifting gas and the nocturnal cooling of the lifting gas and its resulting decrease in buoyancy. This predictability as well as the seasonal variation allows the starting and stopping of the cyclical thermal management to be no more complicated than utilizing a clock programmed for seasonal variation or using the sun itself to start and stop the novel cyclical thermal management system.

The least predictable variable in the stratosphere is the wind. If the wind changes direction then the airship would have to turn into the wind to remain geostatic. This affects the angle, location and intensity of the sun's radiant energy across the surface of the airship. If the wind changes velocity, that affects the rate of convection on various areas of the outside surface. Internal temperature variations caused by the winds, combined with intermittent variations in the heat rejection from the on-board equipment, amount to only a few degrees thus allowing the starting and stopping as well as the rate of the cyclical processes to be based upon elapsed time or the duration of sunlight, but the preferred starting and stopping being based on time, pressure and temperature of the lifting gas.

The novel cyclical thermal management of the lifting gas by heating and cooling physical and chemical processes and reactions allows pitch attitude as well as altitude to be controlled by the regulation or thermal manipulation of the lifting gas. The arrangement of the ballonets, system components and payload is designed to maintain a constant trim during the heating and cooling reactions and processes. The novel cyclical thermal management system prevents collected energy from being wasted by using power to drive propellers in combination with wings or elevators in order to maintain a required pitch attitude. The novel cyclical thermal management system allows both pitch attitude and altitude to be controlled without horizontal stabilizers and elevators to impart an overall stability to novel high altitude platforms constructed utilizing the novel cyclical thermal management system.

The invention achieves its advantages by providing a novel cyclical active thermal management system that cyclically manages the heat and hence the buoyancy of the lifting gas in response to the diurnal heating of the buoyant lifting gas by the sun in the stratosphere. The cyclical thermal management of the heat of the lifting gas is achieved by initiating cyclical physical cooling processes to radiate heat from the lifting gas during the day and collecting solar energy during the day and converting it into stored energy to be used at night in conjunction with cyclical physical and chemical heating processes to add heat to the lifting gas during the night to maintain the lifting gas at a relatively constant pressure. Excess collected solar or thermal energy obtained from solar cells or thermionic cells may be stored in batteries or used for propulsion or for the operation of payload equipment. At night a cyclical exothermic process and reaction is initiated to add heat to the lifting gas to maintain the lifting gas at a relatively constant pressure.

The preferred cyclical active system for thermal management of the lifting gases employs cyclical chemical and physical heating and cooling processes and reactions utilizing hydrogen, oxygen and nitrogen since both oxygen and nitrogen are present in the stratosphere and can be vented and later reacquired from the stratosphere as raw materials and subsequently recombined with hydrogen without limiting the duration of the mission of the high altitude platform in the stratosphere. Cyclical reactions involving recyclable hydrogen containing energy storage materials such as water, methanol and other materials containing hydrogen as part of water in a crystal or hydrated form of the material are materials that will be referred to collectively as a hydrogen containing energy storage material. These hydrogen containing energy storage materials and particularly recyclable hydrogen containing energy storage materials can be used not only to store hydrogen combined with another material such as oxygen as ballast for seasonal variations in the daily heating and cooling cycles but also allows hydrogen to be obtained from the ballast and used to replenish a portion of the lifting gases lost as a result of diffusion or in the chemical or thermal manipulation of the lifting gases. Hydrogen can also be combined with other materials to store lifting gas as ballast until needed for seasonal variations in the diurnal heating and nocturnal cooling cycles.

In the cyclical thermal management of the lifting gas recyclable energy storage materials used for reversible physical and chemical reactions include water, methanol, hydrated, ammoniated or methanolated salts, hydrogenated metals, hydrated zeolites, eutectic salt mixtures, desiccant regeneration cycles using water and phase change compounds capable of storing heat. In the preferred embodiment of the invention, water is disassociated during the day and the heat from the formation of water (+68 Kcal/gmol) plus the heat rejected from the physical process is used to provide exothermic heating of the lifting gas during the night. Similarly, in an alternative embodiment of the invention, methanol is disassociated during the day and the heat from the reformation of methanol (+57 Kcal/gmol) plus the rejected heat from the physical process is used to provide exothermic heating of the lifting gas during the night.

The utilization of cyclical reactions of hydrogen with oxygen, carbon and nitrogen thermal cycles allows hydrogen to be utilized as a lifting gas for replacement of any lifting gases lost through diffusion or repeated cyclical management reactions and to be used by itself as a supplemental lifting gas or stored as water or methanol for seasonal variations. In the preferred embodiment of the invention solar cells or thermionic cells are utilized to collect solar energy and operate an electrolyzer during the day to store energy in the form of hydrogen and oxygen for use at night and to run the compressors and circulating fans required to mitigate the heating effects of the sun during the day. Excess stored energy is stored in a battery or other electrical storage means such as hydrogen and oxygen which can be used to operate a fuel cell to generate heat from exothermic processes or reactions to heat the lifting gas at night.

The cyclical active system which manages the heat of the lifting gas is preferably used in conjunction with other ancillary cyclical active thermal management systems such as variable heat conductance systems such as shutters, louvers and other sensible heat and latent heat systems of the hydrogen containing energy storage material to utilize and manage heat for heating the lifting gas during the night and then reversing some of the physical and chemical processes to cool or reduce the heating of the lifting gas during the day by utilizing latent heat and sensible heat in the hydrogen containing energy storage material. The cyclical active system also includes a novel selectively inflatable envelope or blanket and recyclable energy storage means such as hydrogen and oxygen that can be used to operate a fuel cell to generate heat in envelope of novel high altitude platforms constructed in accordance with the invention. In accordance with the invention the side of the envelope in direct exposure to the sun's energy is inflated to increase the insulation on this side of the envelope to reduce the heating of the enclosed lifting gas. On the opposite side of the envelope the thermal blanket is deflated to increase the dissipation of heat through the lifting gas and outside the envelope to the shaded side of the high altitude platform where it is radiated into space and convected into the cold atmosphere.

At night the skin is inflated on both sides to insulate the upper half of the high altitude platform to prevent the escape of heat. The cyclical active system also includes fans inside the envelope containing the lifting gas to assist the natural convection currents in maintaining the uniform temperature of the lifting gas.

The cyclical active thermal management system, in the preferred embodiment of the invention is employed with a passive system which reduces the number of heat or energy manipulation steps required to maintain the lifting gas at a constant volume or pressure to control buoyancy. The passive system includes the selection and utilization of varying types of skin materials for the top and bottom of the envelope, reflective coatings on the top side of the high altitude platform to reflect heat and the absence of a reflective coating on the bottom to facilitate absorbing the albedo flux at night to help heat the lifting gas at night and the use of thin reflective coatings, such as aluminum or gold, on the inner layers of the skin or preferably the innermost layer of the skin of the envelope to help maintain a constant pressure of the lifting gas during the day and at night. These passive systems all pertain to the selection of material components to reduce to a minimum the amount of heat manipulations of the lifting gas required by the cyclical active system to maintain the lifting gas at a constant pressure throughout the diurnal heating and nocturnal cooling cycles as well as the seasonal variations of those cycles in relation to a particular geostatic location.

The lifting gas used to provide buoyancy of the high altitude platform may be helium, hydrogen, methane or combinations thereof which are manipulated or processed by the cyclical active system to maintain a geostatic position. Helium and hydrogen and helium and methane combinations are preferred since hydrogen can be utilized to replace lifting gas lost through diffusion and hydrogen can be obtained from the hydrogen containing heat or energy storage material which can act as both an energy storage material and as a ballast material. Hydrogen can alternatively be used to maintain buoyancy or be combined with oxygen and possibly nitrogen that can be obtained from the stratospheric environment and stored or processed in readily accessible compositions to impart lift or reduce lift and to provide flexibility in responding to seasonal variation in the diurnal heating and nocturnal cooling cycles while extending the duration for which the high altitude platform can stay aloft.

The novel cyclical thermal management system contributes to the duration for which a high altitude platform can stay aloft by providing a more efficient and environmentally compatible system for maintaining a high altitude platform in a geostatic position. Instead of having to collect solar energy and then wasting the solar energy on engines, propellers, elevators and other components that become increasingly inefficient and larger with each increase in altitude, the novel thermal management system of the invention provides a more efficient utilization of solar energy to manipulate and regulate the lifting gases to control both altitude and pitch attitude. Unlike the prior art the novel altitude and pitch attitude control provides increasing efficiency in the stratosphere as altitude increases.

The increase of efficiency in the utilization of solar energy provided by the novel cyclical thermal management system allows reduced reliance upon engines and propellers to control altitude and pitch attitude in the stratosphere. As a result most of the power requirements of the propulsion system, engine and propellers can be used to maneuver the high altitude platform for station keeping or counteracting the stratospheric winds at a particular geostatic location. The propulsion systems that may be utilized to propel the high altitude platform from place to place in the stratosphere or to counter the winds aloft can be electric, turbine such as are used on conventional aircraft, hydrogen burning engines or ion engines or other such propulsion devices known in the art. These propulsion systems can also be selected for greatest compatibility with the novel cyclical thermal management system and, where desirable, arranged so that engine heat can be utilized to provide an additional source of heat to counteract the effects of nocturnal cooling and, if desired, for a particular mission utilize excess lifting gas constituents in the form of hydrogen or methane as fuel.

BRIEF DESCRIPTION OF THE DRAWINGS

The objects and advantages of the invention will become apparent to those skilled in the art from the following detailed description of the preferred embodiments when read in conjunction with the accompanying drawings in which:

FIG. 5 is an elevational view comparing a prior art airship with the novel airship constructed in accordance with the invention in a telecommunications station keeping application;

FIG. 6 is an elevational view illustrating pitch attitude variations in a prior art airship compared with the novel airship constructed in accordance with the invention in a telecommunications station keeping application;

FIG. 14 is a cross sectional view taken along the line 14—14 of FIG. 10;

FIG. 15 is a side view of a section of the envelope and skin material from a portion of FIGS. 2 and 14 as represented by circled area 15A;

FIG. 16 is a side view of a section of the envelope and skin material from a portion of FIGS. 2 and 14 as represented by circled area 16A;

DESCRIPTION OF THE PREFERRED EMBODIMENTS

Figure 1:
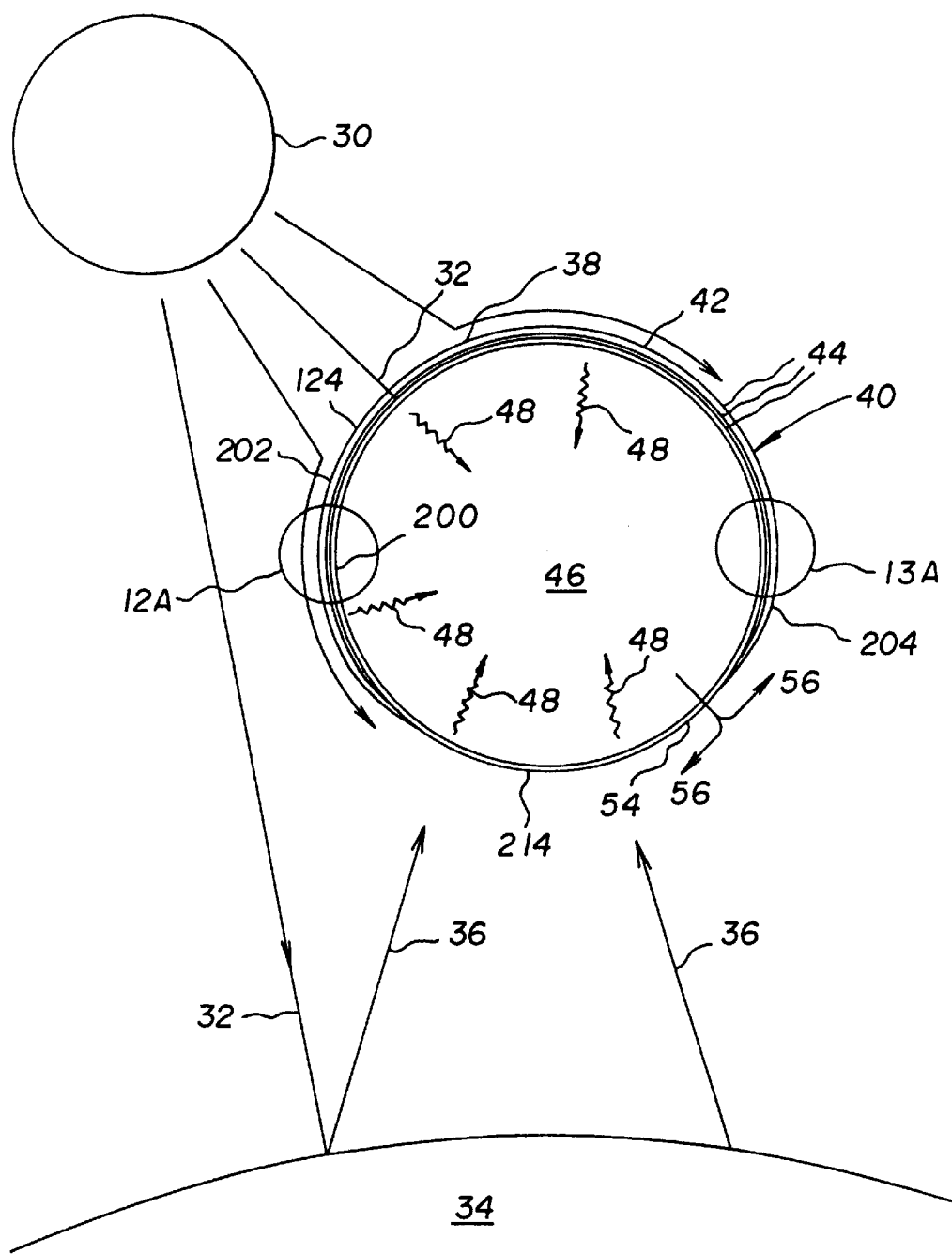
FIG. 1 is a diagrammatic view partly in section illustrating the various sources of energy in the stratosphere during the day and its effect upon the lifting gas in a novel airship constructed in accordance with the invention.

Referring to FIG. 1, the sun 30 is not only the major source of heat in the stratosphere but also the major problem for a high altitude platform placed in the stratosphere. *Marks Standard Handbook for Engineers*, Section 9–11, reports the radiation intensity (solar constant) varies with latitude and the seasons and in the stratosphere, it will average between 1,070 W/m² and 1,370 W/m² (watts per square meter). During the day, direct solar energy 32 strikes the portion of the envelope facing the sun 30. The direct solar energy 32 also penetrates the troposphere and the water vapor in the troposphere and increasingly heats the air as the density of the air increases until it strikes the earth 34 whereupon most of it is absorbed but some of it is reflected back as albedo reflected energy 36 up into the stratosphere. From there the energy from either the sun or albedo striking the skin 38 of the high altitude platform 40 is conducted around and through the outside surface 42 of the multilayered envelope 44 and then radiated into the lifting gas 46 as infrared energy 48 which heats the lifting gas and which, if unchecked, causes the high altitude platform to begin to rise with a pitch up or pitch down, roll right or roll left attitude depending on the area of localized heating.

Figure 2:
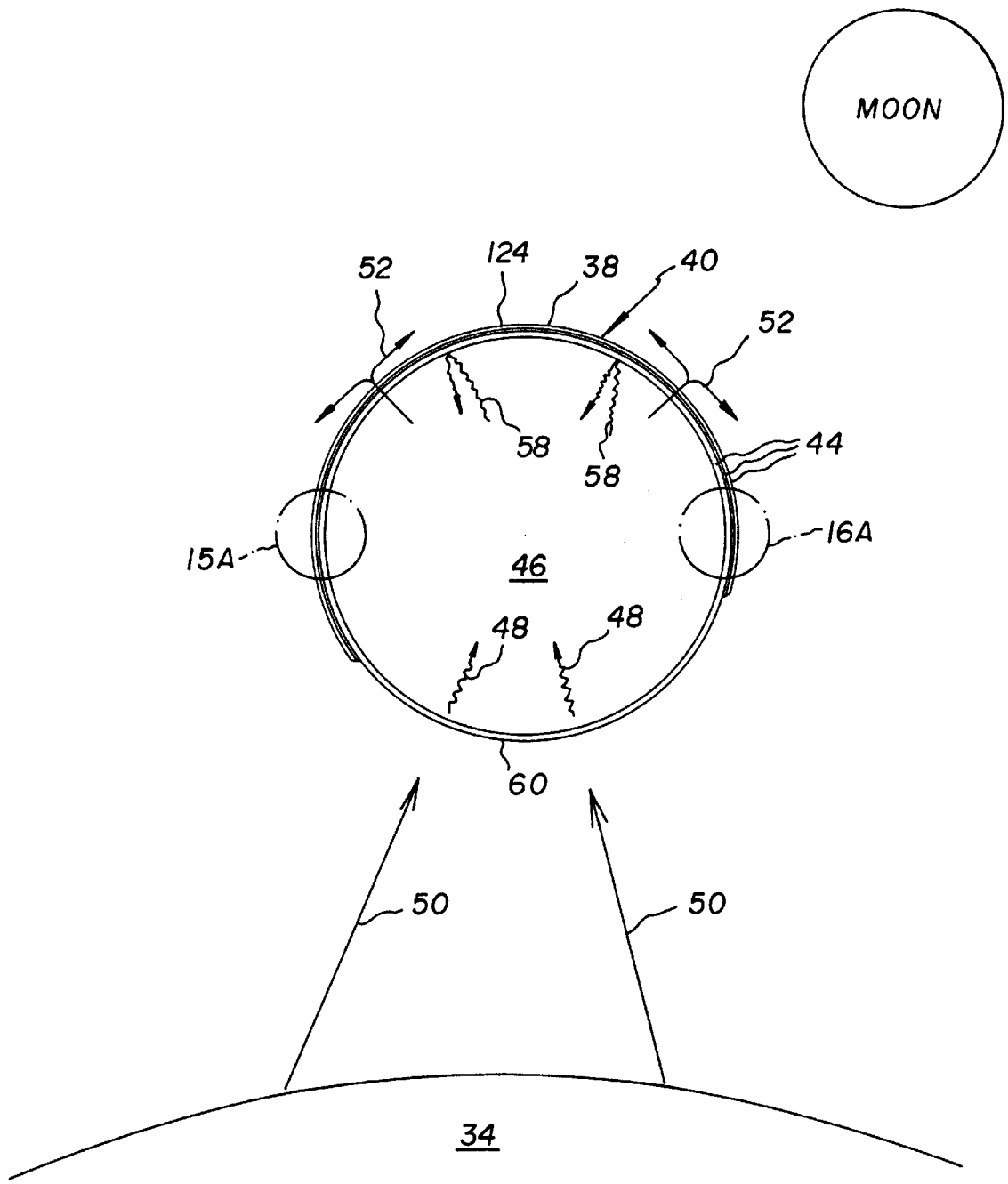
FIG. 2 is a diagrammatic view partly in section illustrating the heat losses and the utilization of albedo flux energy in the stratosphere at night and its effect upon the lifting gas in a novel airship constructed in accordance with the invention.

Conversely, during the night (FIG. 2) the sun stops heating the high altitude platform directly and nighttime albedo flux 50 energy is radiated from the earth. Therefore, if the envelope of the prior art high altitude platform has remained intact, most of the heat in the lifting gas 46 is radiated and convected out into the cold (−50–60° C.) thin atmosphere as represented by arrow 52 causing the high altitude platform to fall to the earth at night unless ballast is removed. Unfortunately, generally because the sun and the albedo flux can add more heat during the day than can be radiated and convected away, and the albedo flux retards the cooling process at night, the lifting gas tends to get hotter the longer the prior art high altitude platform stays aloft. Further, seasonal variations in the length of the days make it even harder to control these diurnal heating and nocturnal cooling cycles.

The novel high altitude platform 40 (FIG. 1) of the invention minimizes the effects of diurnal heating and nocturnal cooling cycles by utilizing a novel multilayered envelope 44. The novel multilayered envelope 44 is selectively and differentially inflated during the day to reduce the amount of infrared energy 48 coming through the sunny side 202 of the envelope while allowing the heat from the lifting gas 46 to conduct and radiate through the layers and then radiate out the side opposite 54 the sun as emitted energy 56 to reduce the heating effect of the sun during the day. At night the novel multilayered envelope 44 (FIG. 2) is inflated on both sides to reduce the amount of heat 58 conducted and radiated from the enclosed lifting gas 46 to the outside of the envelope and then radiated out into space and convected out into the atmosphere as represented by arrow 52. Multilayered envelope 44 has a transparent surface 60 and has no reflective coating on the skin facing the earth 34 to take advantage of albedo flux 50 energy radiated back from the earth at night. The selective and differential inflation of the novel multilayered envelope 44 will be described hereinafter in greater detail.

Figure 3:
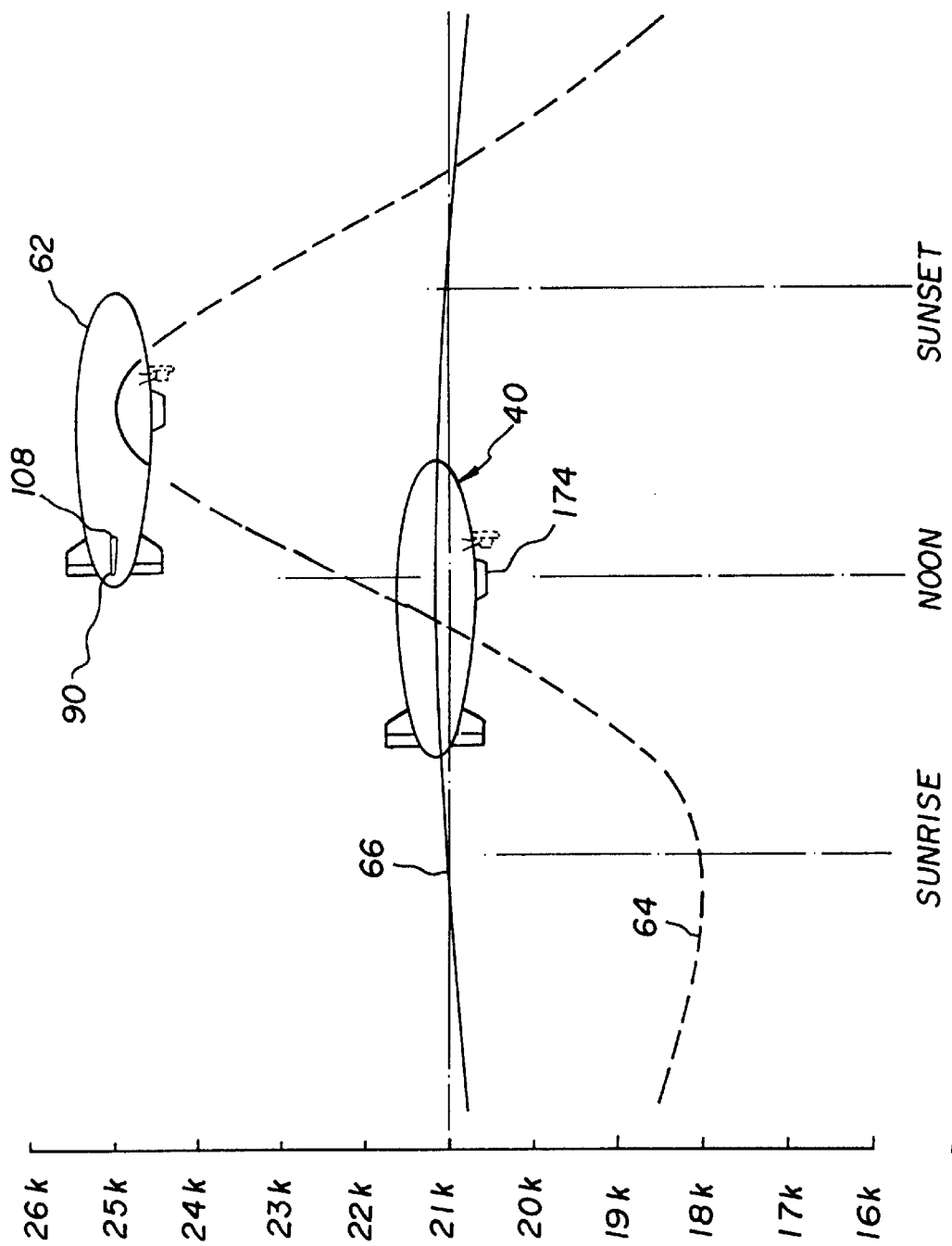
FIG. 3 is a graph with curves illustrating a diurnal cycle effect upon the altitude of a prior art airship and a novel airship having the novel thermal management system of the invention.

FIG. 3 is a chart comparing the altitude variation of a typical prior art airship 62 with the novel high altitude platform 40 of the invention as a result of the effects of the diurnal heating and nocturnal cooling cycles. As illustrated by curve 64, shortly after sunrise, the prior art airship 62 will begin ascending until the sun passes its apex and the temperature of the lifting gas stops rising which is generally sometime in the afternoon. Continuing along the curve 64, the prior art airship 62 begins descent in the late afternoon as the lifting gas begins to cool and continues until the cycle starts again shortly after sunrise. The novel geostatic high altitude platform 40 stays within plus or minus 700 meters of its prescribed altitude (FIGS. 3, 9) as represented by curve 66.

While the temperature difference between day and night varies based on geographic location, the design and other relevant aspects of the airship, it can be calculated for a specific case. For example, it has been calculated that, for a stratospheric airship displacing approximately 212,500 cubic meters at 21 kilometers, the temperature difference would be in the range of 100° to 150° Kelvin. That means the temperature difference caused by the diurnal cycle will cause the lifting gas to expand and contract 35–40% per day. This expansion and contraction is further exacerbated with each change in altitude because, as the airship begins to climb, the air becomes less dense causing the lifting gas to expand even more. Or, as the airship begins to descend, the air becomes denser causing the lifting gas to contract even more. These variations in the lifting force can easily cause an airship to rise or fall tens of kilometers per day. Without some means of controlling the diurnal heating and nocturnal cooling cycle the airship would quickly rise uncontrollably or (more probably) fall to the ground during the night. Even if sufficient gas and ballast are added to extend the flight duration of the airship the constant expansion and contraction imposed on the envelope and skin material causes the skin material to degrade and eventually fail.

Figure 4:
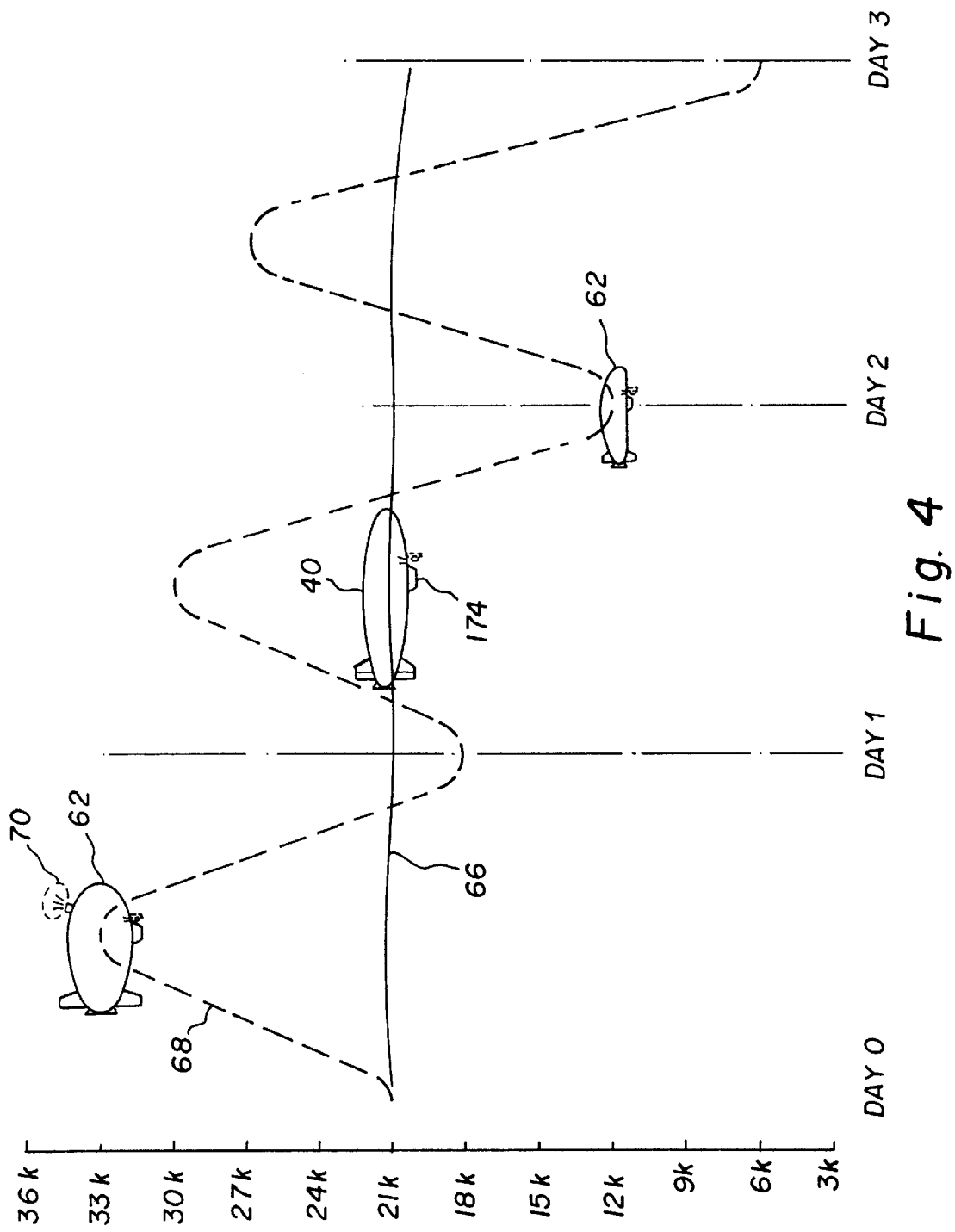
FIG. 4 is a graph similar to FIG. 3 illustrating a diurnal cycle effect upon the altitude on a prior art airship and the novel airship over a 3-day period.

Referring now to FIGS. 4 and 5 the effect of the diurnal heating and nocturnal cooling cycle is illustrated for prior art airship 62 and the novel high altitude platform 40 in a telecommunications station keeping application. A prior art solution to the heating and cooling cycle which only limits the amount of expansion and contraction to keep the airship 62 between 20 and 30 kilometers in altitude, and which may prevent the airship from destroying itself, limits its utility. Airship 62 without the novel thermal management system of the invention rises along geostationary curve 68 (FIG. 4) until the lifting gas expands to the design limit of the envelope which opens a valve venting lifting gas 70 to prevent rupturing the envelope. Once this occurs the prior art airship will oscillate daily in a geostationary curve 68 until it can no longer be sustained aloft.

The oscillation along geostationary curve 68 is also illustrated in FIG. 5 in the utilization of prior art airship 62 as a telecommunications platform. Prior art airship 62 may start at the same altitude as the novel high altitude platform 40 flying at a predetermined altitude 72 above the earth 34. At predetermined altitude 72 the prescribed design beam 74 and prescribed footprint 76 are in their proper predetermined design area. Footprint 76 for the prior art airship 62 and high altitude platform 40 will be the same until prior art airship 62 gains altitude resulting in divergent beam 78 and divergent footprint 80 illustrating the path radio and radar waves emanating from a transceiver device on the prior art airship 62 would take, or the area of focus from a camera or sensor mounted on the airship. At night the drop in altitude by airship 62 results in a contracted divergent beam 82 and contracted footprint 84 that results in a constant changing in the distance and size of the footprint. These large fluctuations in distance and the size of the footprint force the radio transceivers, radar, cameras, sensors, etc. into unnecessary switching, signal tracking, recalibration, refocusing and other similar adjustments. Unlike the prior art the prescribed footprint 76 remains constant as a result of maintaining a geostatic position by novel high altitude platforms constructed in accordance with the invention.

The high altitude platform must also remain relatively level around the pitch and roll axis. Referring to FIG. 6, a prior art airship 62 starts out with the same predetermined altitude 72 and level attitude as the novel high altitude platform 40. The prior art airship 62 without the novel thermal management system of the invention changes pitch and roll due to the sun position and selective heating of a portion of the outside envelope resulting in the selective heating of a portion of the lifting gas. The selective heating of a portion of the lifting gas causes a pitch up attitude 86 or a pitch down attitude 88.

Alternatively, even if selective heating is avoided in prior art airship 62 by circulation and a mixing of the lifting gas, the general increase of temperature and heating of the lifting gas will cause the airship to rise. The increase in altitude must now be controlled by venting or by running the engine and using elevators 90 (FIG. 3) and engine power to pitch the nose down resulting in the pitch down attitude 88 causing shifted footprint 92. Conversely, at night the cooling of the lifting gas and loss of lift must be corrected by dropping ballast or a pitch up attitude 86 to maintain altitude 94 which results in shifted footprint 96. Changes occurring in both altitude and pitch attitude causes severe problems since small variations in pitch attitude required to raise or lower the altitude in the prior art airships make major shifts in shifted footprints 92 and 96 and once again the radio transceivers, radar, cameras, sensors, etc. on board are forced into unnecessary switching, signal tracking, recalibration, refocusing and other similar adjustments. All of these extra adjustments and compensations reduce the utility and value of the images or transmissions. Further, the extra equipment required for all this tracking and adjustment increase the complexity and decrease the reliability of the system to an unacceptable level of operation.

Figure 8:
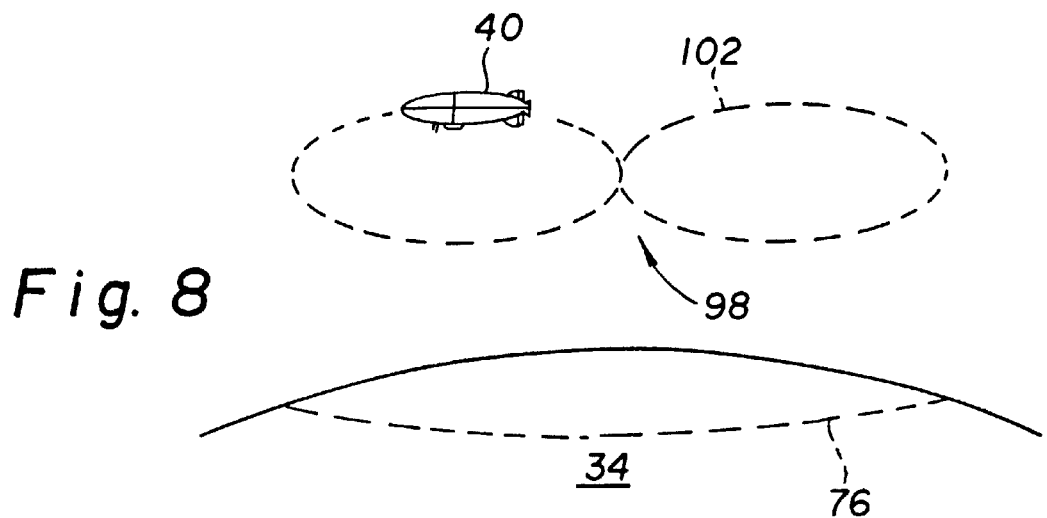
FIG. 8 is an elevational view similar to FIG. 7 illustrating a further stratospheric station keeping flight pattern.
Figure 7:
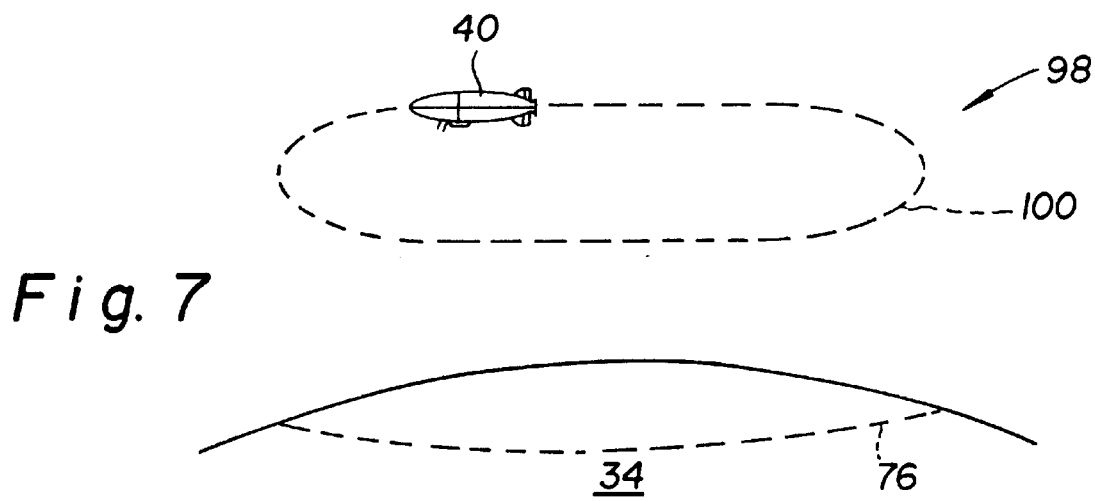
FIG. 7 is an elevational view illustrating a stratospheric station keeping flight pattern.
Figure 9:
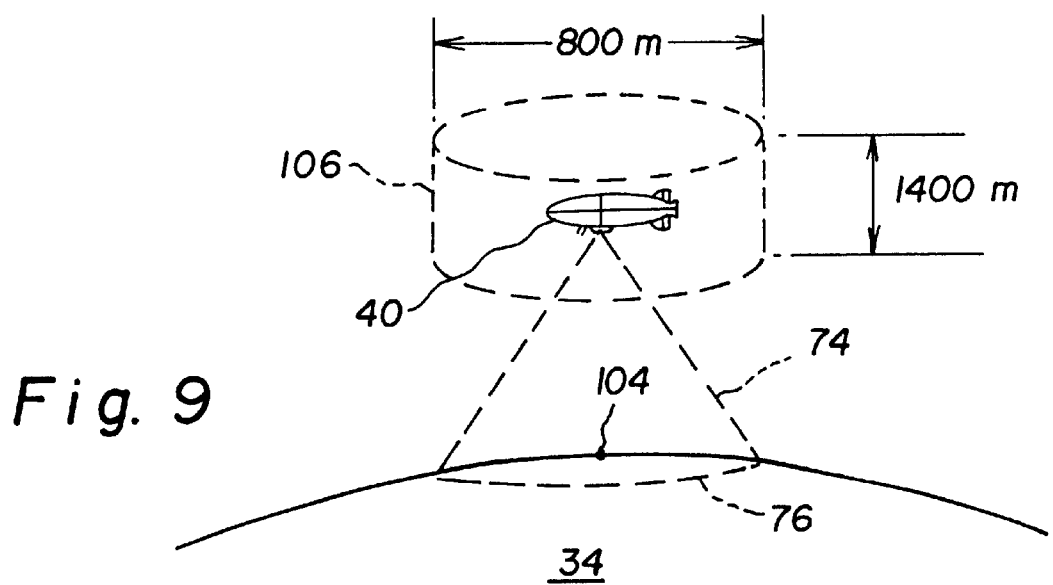
FIG. 9 is an elevational view illustrating altitude and horizontal area limitations for a geostatic telecommunications application for a stratospheric high altitude platform.

Some stratospheric applications, like monitoring deforestation, are more forgiving than others. They only require the airship loiter over a general geographic area 98 (FIG. 7) by flying in a predetermined pattern such as an oval 100 (FIG. 7) or figure eight 102 (FIG. 8). In these cases, the airship still must maintain a level pitch attitude and a constant altitude or else the footprint will deviate from the predetermined path. The most demanding stratospheric applications, such as traffic monitoring or telecommunications, require that the airship "station keep." Station keeping FIG. 9, is when the high altitude platform 40 stays close enough to a predetermined fixed point 104 such that it will appear virtually stationary to a ground based transceiver or observer. It has been calculated that for certain telecommunications applications, at an altitude of 21 kilometers, the airship has to stay within an 800-meter diameter by 1,400-meter high cylinder 106 centered over the predetermined fixed point 104. The novel high altitude platform 40 utilizing the novel thermal management system of the invention should be able to maintain altitude within plus or minus 400 meters as illustrated in FIG. 9.

The invention enables a novel high altitude platform 40 constructed in accordance with the invention to maintain a constant altitude and attitude in spite of the diurnal heating and nocturnal cooling cycles by regulating the temperature of the lifting gas and hence the buoyancy. Referring again to FIGS. 1, 2, 3, 4, 5, 6 and 9 the result of the effect of diurnal heating and nocturnal cooling cycles is illustrated on a novel airship or high altitude platform 40 constructed in accordance with the invention. The novel high altitude platform 40 is not only able to maintain a predetermined altitude range in the stratosphere (FIG. 9) with a prescribed footprint 76 but is most importantly able to control both altitude and pitch attitude by utilizing the novel cyclical thermal management system. Unlike the prior art the novel high altitude platform 40 can change altitude without changing pitch attitude by managing the heat of the lifting gas to allow the novel high altitude platform to gain or lose altitude in a flat horizontal attitude without change in pitch attitude. The control of the pitch attitude and altitude components of flight by the novel thermal management system of the invention reduces the power required by the propulsion system and allows the propulsion power to be more effectively used to counteract stratospheric wind forces.

Reliance in the prior art upon pitch change to change altitude or pitch change to maintain altitude by using engines, propellers and elevators is a highly inefficient way to control altitude because it increases drag and consumes more fuel and becomes more inefficient with each increase in altitude since air density decreases with altitude. The novel thermal management system allows both altitude and pitch control to be changed by the thermal management of the lifting gas. This pitch and altitude control becomes more efficient with increased altitude up to the threshold of space since the density of the air decreases with altitude. This allows novel high altitude platforms constructed in accordance with the invention to be constructed without a prior art horizontal stabilizer 108 and elevators 90 (FIG. 3) while maintaining a geostatic position as will be described hereinafter in greater detail.

Referring now to FIGS. 1, 2, 10 and 11 a novel high altitude platform 40 is illustrated constructed for long duration in the stratosphere in accordance with the best mode of the invention. High altitude platform 40 has a semi rigid outside envelope 110 and maintains a geostatic position by utilizing the novel cyclical thermal management system to control altitude and pitch attitude while utilizing engines with associated propellers 112, 114 and 116 (FIG. 11) and vertical stabilizers 118 and rudders 120 to control roll and horizontal geostatic position. Engines with associated propellers 114 and 116 can be used differentially with rudders 120 to make rapid changes in horizontal position by utilizing differential or reversing one of the engines as will be recognized by those skilled in the art.

The control of altitude and pitch attitude provided by the novel cyclical thermal management system and the elimination of the horizontal stabilizer and elevator not only saves weight but allows vertical stabilizers 118 and rudders 120 to be made larger to control the roll axis. High altitude platform 40 includes a semi rigid outside envelope 110 of a general shape and rigidity that must be maintained throughout repeated diurnal heating and nocturnal cooling cycles. The general shape, rigidity and life of envelope 44 is dependent upon the amount of stress placed upon the skin 38 by lifting gas 46. The shape and rigidity is maintained by internal pressure of the lifting gas 46 which is maintained at a substantially uniform volume and hence buoyancy by the novel cyclical thermal management system of the invention which employs a combination of active and passive systems.

The cyclical thermal management system manipulates, regulates or processes the heat of the lifting gas 46 in multilayered envelope 44. The cyclical processing of heat responds to the diurnal heating cycle of the sun by beginning to mitigate the heat as the sun rises and begins to heat the lifting gas to maintain a substantially constant pressure of the lifting gas to reduce the stress on the multilayered envelope 44 thus preventing leaks and material failures. The cyclical processing of heat responds to the nocturnal cooling cycle by beginning to heat the lifting gas at or slightly after the heat of the lifting gas begins to drop due to radiational cooling at night to maintain multilayered envelope in its semi rigid condition during the night.

The cyclical thermal management of the heat is provided by the enthalpy control of a ballast component or another lifting gas to utilize the latent heat, sensible heat and endothermic and exothermic physical and chemical processes of the ballast components or one portion of the lifting gas to cyclically heat, cool and mitigate the heat build-up in the remaining lifting gas. Recyclable heat and energy storage materials used for reversible thermochemical and physical reactions preferably include hydrogen containing compounds such as water, methanol, hydrated, ammoniated or methanolated salts, hydrogenated metals, hydrogenated zeolites, eutectic salt mixtures and recyclable phase change crystals and desiccant regenerative cooling systems which use hydrogen or water alone or as part of the water of hydration of a material as part of the exothermic or endothermic physical or chemical processes.

Desiccant regenerative cooling systems are particularly suited for applications inside the envelope where, because of our novel multilayer system, heating and cooling loads are about equal and where there is high humidity. While humidity and water is virtually non-existent in the stratosphere, water can be taken as a ballast component or be formed in the stratosphere from oxygen obtained from the stratosphere and the hydrogen carried in the hydrogen containing heat storage material. The hydrogen containing heat or energy storage material can also be used to create high humidity inside the envelope containing the lifting gas to provide a cyclical thermal management system and hydrogen gas storage and replenishment system in accordance with the invention. These systems provide not only the necessary heating and cooling cycles but also allow hydrogen to be utilized as a replacement lifting gas for lifting gas lost through diffusion and allow the storage of hydrogen in a compound form in the cyclical energy storage materials or as additional lifting gas for seasonal variations of the diurnal heating and nocturnal cooling cycles.

Referring to FIGS. 1, 10, 11, 17 and 18 the novel cyclical thermal management system is illustrated in the best mode using the recyclable hydrogen containing energy storage material water for exothermic and endothermic physical and chemical processes for the cyclical active system for thermally managing the heat of the lifting gas 46 which in this case is helium and preferably is a helium hydrogen combination containing about 90 percent helium and 10 percent hydrogen. A first converter or disassociator which may be a catalytic converter or electrolyzer 122 is provided which preferably operates on electricity supplied from thermionic or solar cells 124 disposed on the outside surface 42 of high altitude platform 40. Solar cells are commercially available from a number of sources and thermionic cells may be obtained from Hi-Z Technology, Inc. of San Diego, Calif. A disassociator or an electrolyzer may be obtained from the Hamilton Standard Division of United Technologies in Windsor Locks, Conn. or from Cirmac International of Apeldoorn, the Netherlands. Compressor 131 draws a mixture of water vapor 126 and/or water 146 from vapor, water and ice ballonet 128 and delivers water to the electrolyzer 122 which converts the water into hydrogen gas 130 (FIGS. 11, 17 and 18) which is transported via tubing 132 to hydrogen ballonet 134 and oxygen gas 136 which is transported via tubing 138 to oxygen ballonet 140. Oxygen gas 136 from the disassociation of water is transported via tubing 138 to oxygen ballonet 140. The electrolyzer 122 preferably utilizes electricity provided by solar energy 142 (FIG. 18) from cells 124 to continue the electrolysis process which recycles the water into hydrogen and oxygen to be used at night to heat the lifting gas 46. The endothermic reaction from the melting of ice 144 in the vapor, water and ice ballonet 128 provides only part of the heat mitigation processes for cooling lifting gas 46 during the day. Sensible cooling and latent cooling from physical changes also provides cooling of the lifting gas 46 since vapor, water and ice ballonet 128 provides phase change cooling or latent cooling as ice 144 melts in ballonet 128. Cooling is also provided by sensible cooling as water 146 warms and under certain conditions may even go through a liquid gas phase change. Water vapor 126 and water 146 may be removed from vapor, water and ice ballonet 128 through water vapor tube 148 or water tube 150 for conversion in electrolyzer 122 to provide oxygen and hydrogen for the fuel cell 156 to use at night to heat the lifting gas 46.

A first fan 152 and a second fan 154 or a plurality of fans or other appropriate circulation devices are provided to mix the warmer and cooler lifting gas 46 to maintain a substantially uniform temperature and pressure of the lifting gas throughout the interior of the multilayered envelope 44 and to prevent localized heating by the sun that might otherwise cause changes in trim and pitch attitude and if propellers 112, 114 and 116 are utilized to avoid possible altitude changes.

The physical and chemical cooling processes are reversed when cooling of lifting gas 46 is no longer required to maintain a geostatic position. Referring now to FIG. 10, 14, 17 and 18 hydrogen gas 130 from hydrogen ballonet 134 is combined with oxygen gas 136 from oxygen ballonet 140 to produce water and provide radiant heat 160 (FIG. 14) to heat lifting gas 46 at night to maintain a geostatic position. The recombination of hydrogen and oxygen in a reformer or reconverter 156 is in the preferred embodiment of the invention a fuel cell such as may be obtained from Hamilton Standard Division of United Technologies of Windsor Locks, Conn., or a catalytic reformer as may be obtained from Cirmac International of Apeldoorn, The Netherlands. Reconverter 156 is placed on stand 158 in vapor, water and ice ballonet 128 so that heat 160 resulting from the reconversion of hydrogen gas 130 from hydrogen ballonet 134 with oxygen gas 136 from oxygen ballonet 140 heats lifting gas 46 at night. The top 162 of reconverter is extremely hot producing hot water vapor 126 which cools and collects as water 146 and ice 144 during the night. The water 146 and ice 144 stores latent and sensible heat that is used the next day in the physical and chemical endothermic reactions to cool lifting gas 46. Hydrogen gas 130 from hydrogen ballonet 134 is introduced by pump 135 to reconverter 156 from tube 164 (FIG. 17) while oxygen gas 136 from oxygen ballonet 140 is supplied through pump 137 to reconverter 156 from tube 166. Water vapor 126 is discharged into water and ice ballonet 128 through reconverter discharge 168.

The operation of reconverter 156 also releases electricity along with the radiant heat 160 in the process $2H_2 + O_2 \rightarrow 2H_2O + \text{electricity} + \text{heat}$. Electricity in this embodiment may be used to run the circulating first fan 152 and second fan 154 during the night along with keeping the backup batteries 170 and 172 in payload pod 174 charged. Backup batteries are charged during the day by the solar cells and used as power sinks and to provide power to the compressors and fans during the transition periods from solar to fuel cells or in an emergency. Electricity from this process may provide backup or additional power for other electrical devices on board such as telecommunications equipment or an electric propulsion system. Generated heat 178 from the operation of telecommunications equipment 176 in payload pod 174 may be utilized to heat lifting gas 46 at night using generated heat 178 which is radiated through the bottom of skin 38 to heat lifting gas 46 at night. Thermal shutters 182 are opened and louvers 184 are closed at night to assist in the utilization of generated heat 178 to heat lifting gas 46 at night. During the day thermal shutters 182 are closed and louvers 184 in payload pod 174 are opened to assist in the dissipation of heat from the sides and bottom of payload pod 174.

Figure 19:
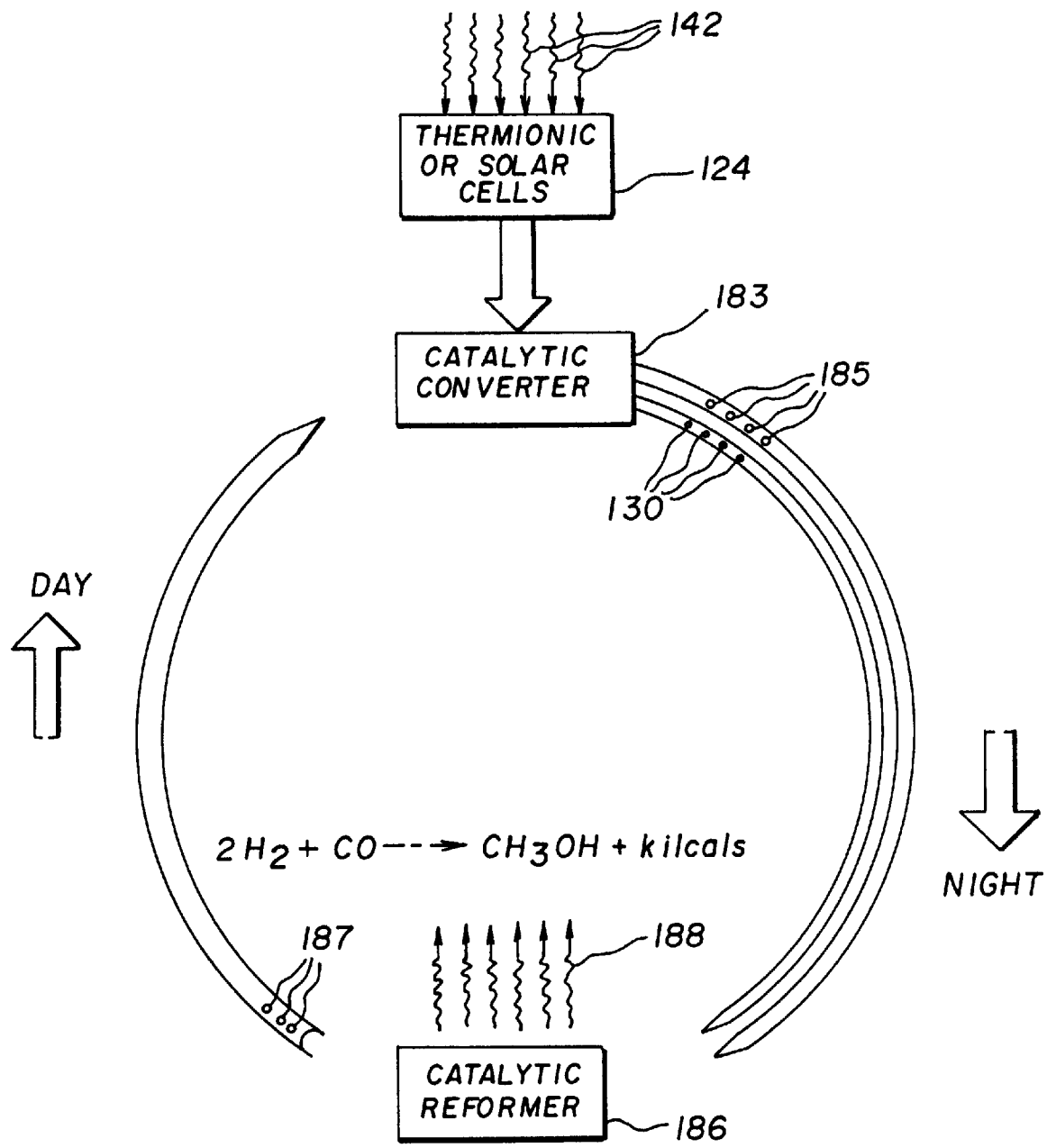
FIG. 19 is a diagrammatic cross sectional view similar to FIG. 18 illustrating the daytime and nighttime operation of the novel cyclical thermal management system in accordance with an alternative embodiment of the invention.

In an alternate embodiment of the invention illustrated in FIG. 19 a methanol/hydrogen containing heat storage material is utilized in a methanol/hydrogen cyclical thermal management system in place of the water/hydrogen thermal management cycle as previously described. In this embodiment, solar energy 142 from thermionic or solar cells 124 collect a portion of the solar energy 32 during the day and convert it to electricity. A catalytic converter 183 utilizes this electricity to generate the optimum temperature (320–340° C.) to convert methanol into hydrogen gas 130 and carbon monoxide gas 185 in the presence of a catalyst. This process recycles the methanol into hydrogen and carbon monoxide to be used at night to heat the lifting gas which may be helium, hydrogen, methane or any other suitable lighter-than-air gas and stored in separate storage ballonets in the novel high altitude platform.

Figure 10:
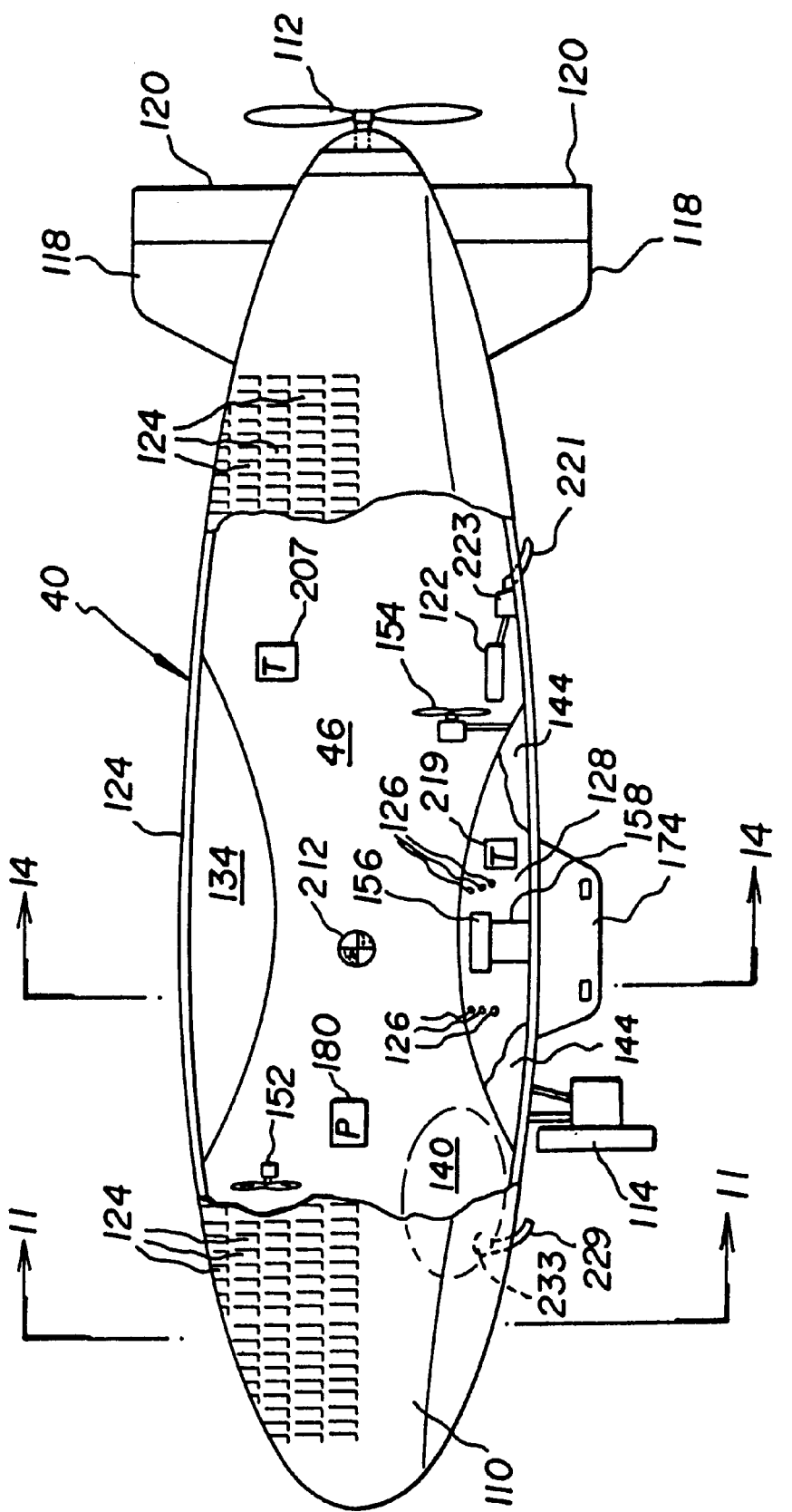
FIG. 10 is a side elevational view partly in section illustrating a novel airship constructed in accordance with the invention.
Figure 11:
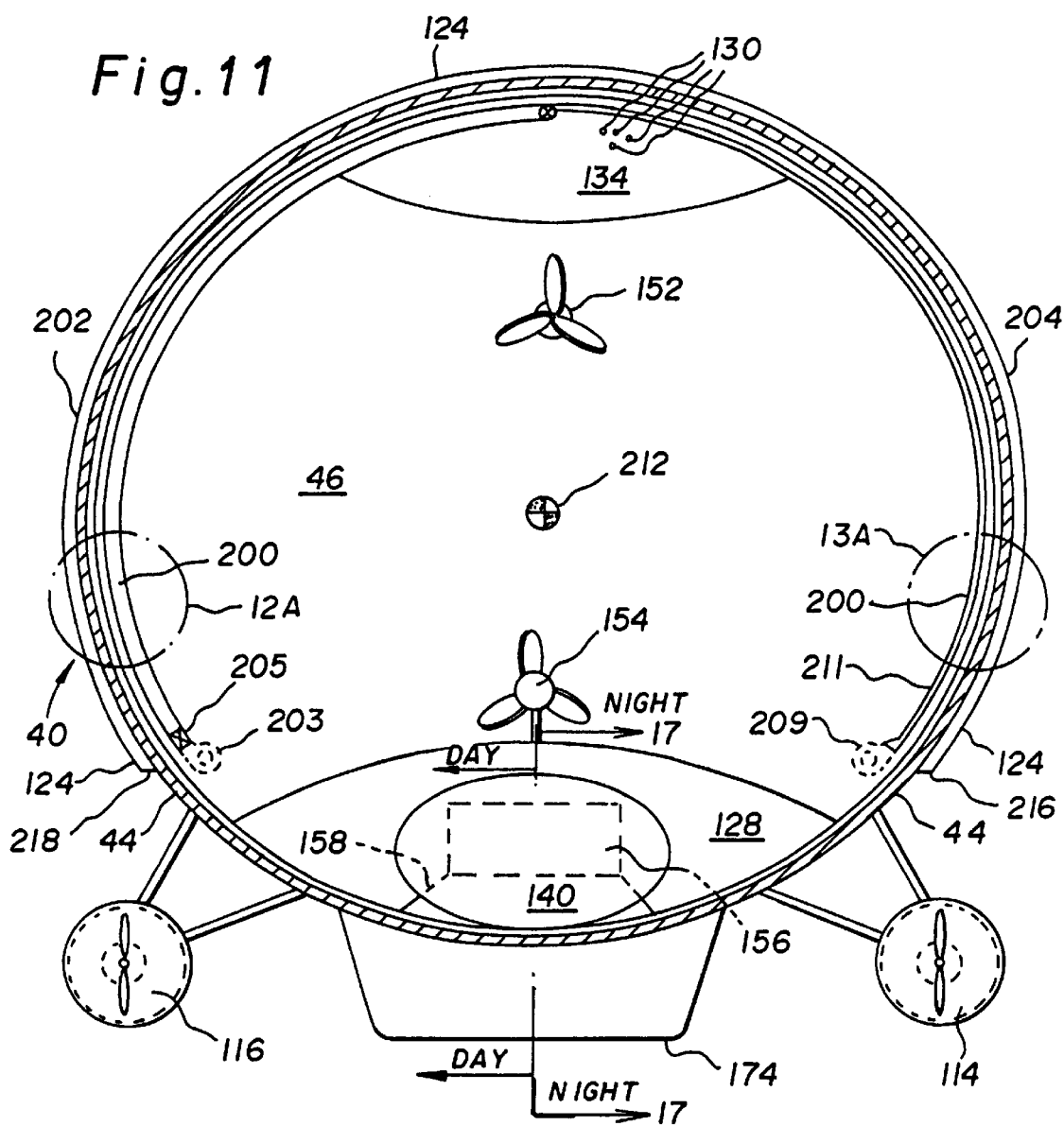
FIG. 11 is a cross sectional view taken along the line 11—11 of FIG. 10.
Figure 12:
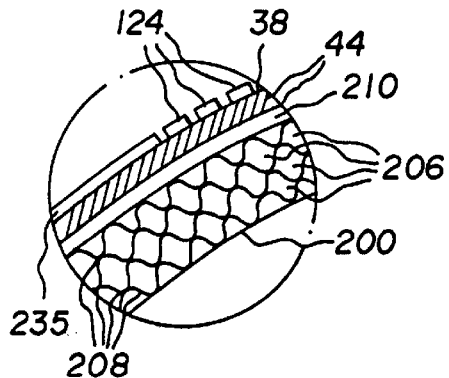
FIG. 12 is a side view of a section of the envelope and skin material from a portion of FIGS. 1 and 11 as represented by circled area 12A.
Figure 13:
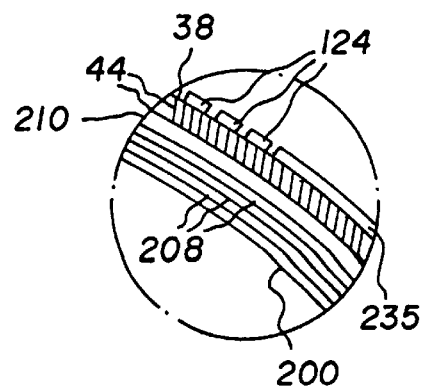
FIG. 13 is a side view similar to FIG. 12 of the envelope and skin material from a portion of FIGS. 1 and 11 as represented by circled area 13A.

During the night the hydrogen gas 130 and carbon monoxide gas 185 are recombined in a catalytic reformer 186 that re-associates hydrogen gas 130 and carbon monoxide gas 185 back into methanol 187 generating radiant heat 188 ($2H_2+CO+H_2O \rightarrow CH_3OH+H_2O$+heat) plus the rejected heat from the physical process. Methanol is then stored in a cold storage ballonet corresponding to water and ice ballonet 128 which is chilled by the ambient atmosphere to store sensible energy and specific energy to provide physical endothermic cooling before the methanol is introduced to catalytic converter 183. Referring now to FIGS. 10 and 19 the catalytic reformer 186 like the fuel cell or reconverter 156 is located directly in ballonet 128 so that the radiated heat from the process of converting carbon monoxide gas and hydrogen gas into methanol 187 provides heat to heat the lifting gas 46. This heliocyclical thermally responsive cyclical process is predictably controlled both diurnally and seasonally to maintain the lifting gas at the same pressure during the night as during the day thus mitigating the diurnal heating cycle and nocturnal cooling cycles to control the geostatic position as well as reducing stresses on skin 38 to reduce the effects of solar degradation of multilayered envelope 44 and maintain the envelope in a semi rigid condition for the novel high altitude platform.

Given the large volume of an airship and magnitude of the temperature differences between day and night, the novel cyclical thermal active system would require a very large active system to manipulate large amounts of material, to maintain buoyancy throughout a long winter's night or a long summer's day. The requirements of a cyclical thermal management system without an additional active insulation system would require the cyclical active system to absorb 50% of the sun's energy during the day and release it during the night and that would only work on the equinox. During the short winter days, or locations at extreme Northern or Southern latitudes, the cyclical thermal management system would have even less time to store the sun's energy and a longer time to heat the lifting gas. During the summer, such a large system would not be working at full capacity having much longer days and shorter nights. As a result the invention also provides an additional active insulation system for differential envelope inflation to minimize the temperature rise during the day and the heat loss during the night and to reduce the size of the system and which helps to compensate for seasonal variations along with an active ballast lifting gas management system. The system of differential envelope inflation selectively shields only the sunny side of the airship since the dark side provides radiation and convection area to help keep the lifting gas cool during the day.

The cyclical active insulation system also utilizes a differentially inflatable thermal blanket 200 that covers the inner surface and extends around side 202 and 204 of high altitude platform 40 to change the insulating values of the multilayered envelope 44. As illustrated in FIGS. 1, 11, 12 and 13 during the day the thermal blanket is selectively inflated with lifting gas 46 longitudinally and axially along the inside surface so that for example area 12A which is in alignment with the sun's rays is inflated by compressor 203 past valve 205 which is closed after inflation to provide an inflated thermal blanket preferably having a honeycomb cellular structure 206 to decrease the absorption of heat into lifting gas 46. On side 204 shaded from the direct sun's rays of the sun thermal blanket 200 is deflated (FIG. 13) so that layers 208 and structure 206 close and may or may not come in contact with one another to assist in the dissipation of heat absorbed by lifting gas 46 into space via radiation which is typically at a temperature of close to absolute zero and convection into the ambient atmosphere which is typically at a temperature of about −49° F. (−45° C.) during the day.

Temperature sensors 207 (FIG. 10) monitor the temperature of the skin 38 of the multilayered envelope 44 to inflate and deflate various portions of the skin areas of the differentially inflatable thermal blanket 200 during the day. Multilayered envelope 44 preferably includes an inner reflective layer 210 to reflect energy penetrating multilayered envelope 44 back through multilayered envelope into the ambient air and to reflect internal energy back into lifting gas 46. Temperature sensors 207 also monitor the temperature of the lifting gas and increase or decrease the speed of fan 152 and 154 or the circulation device as well as increase or decrease the rate of the heating or cooling physical and chemical processes to provide additional heating or cooling of lifting gas 46 and efficiently maintain a geostatic position in the stratosphere.

The active inflation system of differential envelope inflation cooperates with the cyclical thermal management active system and reduces the amount of heat management manipulations required of the cyclical thermal management system by providing an ultra-light inflatable thermal blanket 200 that lines the top and sides of the envelope on the inside. Referring to FIGS. 12, 13, 14, 15 and 16, the thermal layers 208 of the blanket 200 are preferably made of multiple sheets of thin (less than 10 mils thick) aluminized plastic film. These sheets are sealed together in strips to form alternating longitudinal hollow spaces or a honeycomb cellular structure 206 along their length when they are inflated with low pressure lifting gas 46 from compressor 203 or compressor 209. When blanket 200 is deflated 211 (FIG. 11), it has a low insulation value compared to when it is inflated. That is because heat energy travels from molecule to molecule so it is faster and more efficient through the denser thermal layer 208 material than through the less dense lifting gas 46. At night thermal blanket 200 is inflated on both side 202 and 204 of multilayered envelope 44 as illustrated in FIGS. 2, 14, 15 and 16 to reduce the flow of heat energy from the lifting gas 46 to the outside. The thickness of the inner reflected layer or aluminum-coated or gold-coated film, number of layers, size of the hollow spaces and the area of the novel high altitude platform 40 protected by these blankets may be varied to suit the design and application of the airship without diminishing their utility.

A further advantage of the novel cyclical thermal management system is that it maintains the airship's pitch attitude equilibrium without having to divert energy to use elevators to maintain altitude which create further problems by changing pitch attitude to maintain altitude. In addition to maintaining altitude and pitch attitude the novel airship is designed to maintain trim by arranging processed ballast materials around the center of gravity such that their moments are balanced. This technique is well known to practitioners of the art. Referring again to FIG. 10, in this example the ballonets are arranged in their simplest configuration. The hydrogen ballonet 134 is at the top of the envelope 44 and directly over the center of gravity 212 because it is the lightest gas. The water and ice ballonet 128 is at the bottom of the envelope and directly under the center of gravity because it is heavier than air and acts as ballast. The oxygen ballonet 140 may be located anywhere along the bottom of the airship that enables it to fill and empty without upsetting the airship's equilibrium. The oxygen storage location is not as critical as the hydrogen and water because oxygen is only slightly heaver (about 10%) than air.

With this arrangement, the airship will maintain a stable trim throughout the cyclical process for two reasons. First, because the weight of the hydrogen and oxygen is about equal to the water so there is little or no change in buoyancy. Second, the location of the hydrogen, water and oxygen is such that they are balanced around the center of gravity so the airship remains level. An added benefit is that sufficient excess hydrogen can be carried to offset the weight of the electrolyzer, fuel cell, compressors and other related equipment so that the whole system does not detract from the payload.

The control of altitude and pitch with the novel cyclical thermal management system imparts pitch stability to the high altitude platform 40 so that propellers 112, 114 and 116 do not have to be used with an elevator 90 to provide pitch control. This advantage resulting from the novel altitude and pitch control of the novel cyclical thermal management system not only provides for increased stability and utility but also allows hydrogen ballonet 134 to be eliminated since hydrogen lifting gas dispersed through the helium lifting gas will migrate to the area defined by hydrogen ballonet 134 when circulation fan 152 and 154 are not running.

Figure 17:
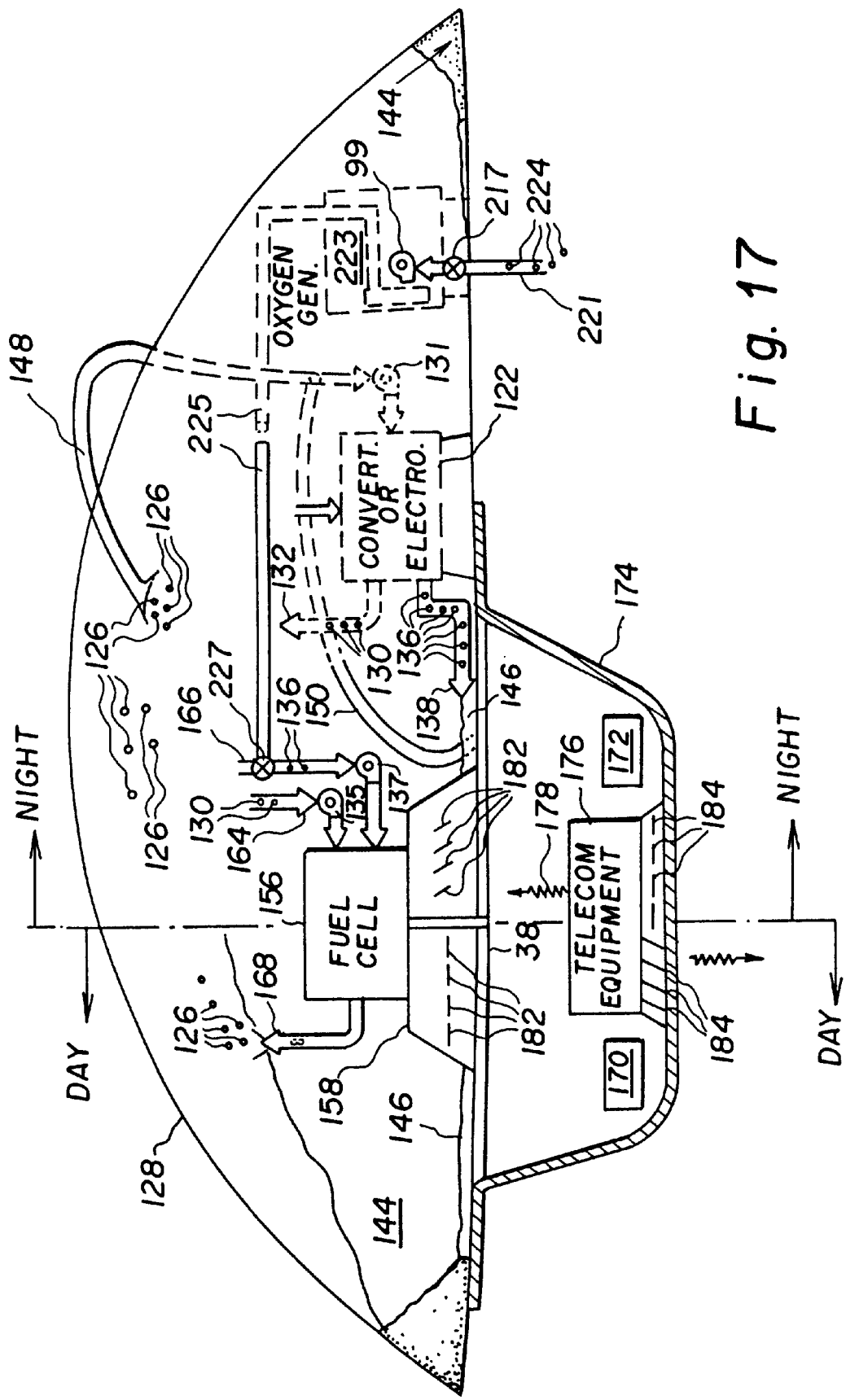
FIG. 17 is a cross sectional view taken along the line 17—17 of FIG. 11 which is also partially schematic in illustrating the components and states of water and the positions of shutters and louvers at night and during the day.
Figure 18:
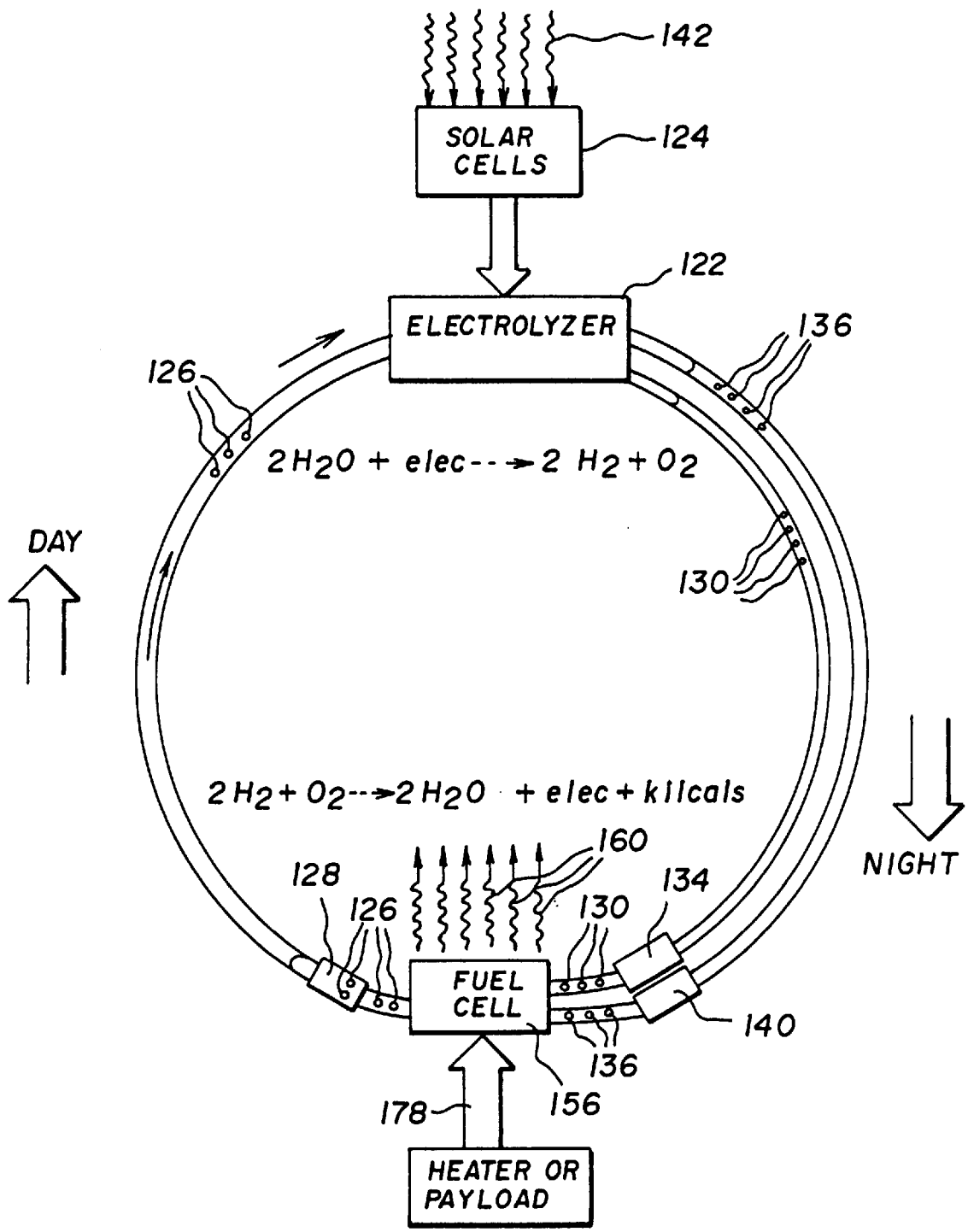
FIG. 18 is a diagrammatic cross sectional view illustrating the daytime and nighttime operation of the novel cyclical thermal management system in accordance with the preferred embodiment of the invention.
Figure 20:
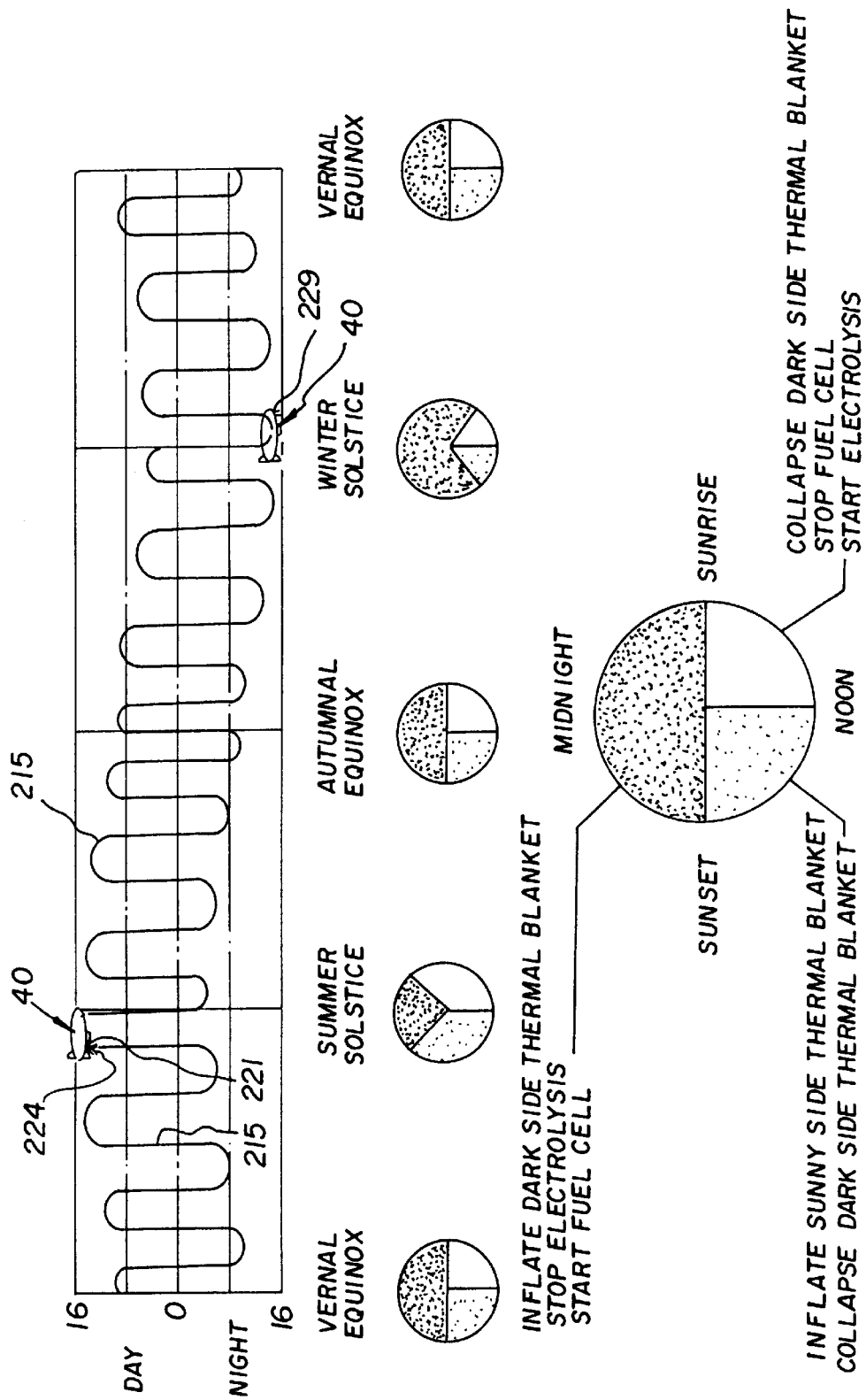
FIG. 20 is a graph illustrating a diurnal cycle with seasonal variation in relation to the novel thermal cycle in a high altitude platform or airship constructed in accordance with the invention.

Referring now to FIGS. 10, 17 and 20 the application of the invention is illustrated to compensate for seasonal variations of the novel cyclical thermal management system of the invention. Curve 215 illustrates a typical diurnal heating and nocturnal cooling cycle from vernal equinox to vernal equinox at about a latitude over Washington, D.C., U.S.A. The particular latitude at which the novel high altitude platform 40 is placed affects not only the duration of the cycle but also the manipulation and storage of the hydrogen containing heat storage material.

As indicated by curve 215 (FIG. 20) the period between the-vernal equinox is marked by longer days and shorter nights. Novel high altitude platform 40 maintains a constant altitude but needs less hydrogen lifting gas and more of the hydrogen containing storage material that in the preferred embodiment of the invention is water. This can be accomplished by opening valve 217 (FIG. 17) to take in ambient air 224 through inlet 221 to oxygen generator 223 which forms oxygen gas 136 and transports the oxygen gas 136 by tube 225 through valve 227 to fuel cell 156. Oxygen gas 136 obtained from oxygen generator 223 is combined with stored hydrogen gas or excess hydrogen gas in hydrogen ballonet 134 or hydrogen gas dispersed in lifting gas 46 which can be hydrogen containing helium lifting gas. The differential inflation of the thermal blanket 200 for various times of the year are also illustrated in graph form in relation to the starting and stopping of the cooling and heating processes of the novel thermal management system.

As the novel cyclical thermal management system passes the autumnal equinox into the winter solstice altitude is maintained with repeated daily cycles of exothermic physical and chemical processes and radiative and convective processes combined with endothermic physical and chemical processes. Between the autumnal equinox and winter solstice days shorten and more hydrogen lifting gas and less hydrogen containing storage material is required to maintain a geostatic position. For example as daylight hours decrease the diurnal heating of the lifting gas 46 decreases resulting in a requirement of increasing the volume of the lifting gas and reducing the weight of the hydrogen containing heat storage material without removing the high altitude platform from its geostatic position. This can be accomplished by converting more of the hydrogen containing heat storage material into supplemental hydrogen lifting gas and venting the oxygen component into the stratosphere. In accordance with the preferred embodiment of the invention the supplemental hydrogen gas is stored in hydrogen ballonet or in the lifting gas 46. Oxygen gas 136 is vented into the stratosphere from oxygen ballonet 140 through valve 233 (FIG. 10) and vent 229 to increase lift and decrease ballast in response to the reduction of daylight in the seasonal variation of the diurnal cycle. As daylight hours again increase oxygen can be reacquired from the stratosphere through valve 217 and fed into oxygen generator 223 by compressor 99 for subsequent reaction with hydrogen to restore the novel cyclical thermal management system to its original equilibrium as heretofore described to again repeat the seasonal cycle.

In a similar manner lifting gas 46 lost through diffusion through multilayered envelope 44 or lost through processing can be supplemented with hydrogen lifting gas from the recyclable hydrogen containing heat or energy storage material. Where the hydrogen heat storage materials is water or a hydrated material hydrogen gas can be separated from water and used to replace the lost lifting gas and the oxygen gas can be vented into the stratosphere.

The novel cyclical thermal management system together with the active cyclical insulation system and the active cyclical seasonal compensation system may also be combined with various passive systems. Passive systems are so called because they do not require moving parts to function. Passive systems rely on the selection of the conductive, convective, absorptive, and emissive properties of the various materials and components as opposed to the expenditure of energy to operate any system. Absorptive properties are expressed as the rates $\alpha$ and emissivity properties are expressed as the rates $\epsilon$. Conductive properties refer to the ability of a material to transmit heat from particle to particle through itself. Convective properties refer to the ability of a material to transmit heat through a fluid (liquid or gas). Emissive properties refer to the ability of a material to emit electromagnetic waves such as infrared energy. Absorptive properties refer to the ability of a material to absorb radiant light energy from an outside source.

Referring now to FIGS. 12, 13, 14 and 15, the passive thermal management system of the invention consists of a specially fabricated multilayered envelope 44 or "skin" that controls the conductive, convective, radiative, absorptive and emissive properties of the envelope thus further reducing the sun's heating effect on the lifting gas. A portion of the envelope 44 will have solar cells 124 affixed to its outer surface or skin 38 (FIG. 12) for supplying electrical power to the novel cyclical thermal management system. These devices for providing electrical power may be solar cells which convert sunlight into electricity or thermionic cells which convert heat into electricity or a combination of both to convert some of the sun's energy into electricity. Since solar cells and thermionic cells have relatively high absorption and emission rates, the solar conversion devices will still transfer a large portion of the sun's energy into the envelope.

To counteract the effect of the high absorption rate those portions of the top and sides of the outer layer of the envelope skin, where there are no solar or thermionic cells and the sun's radiant energy falls, are coated with a specially formulated reflective white coating or layer 235 containing titanium oxide preferably having an absorptivity α of about 0.2 and a high emission ε of about 0.9. This white reflective coating will reflect a portion of the solar energy 32 and will reduce the energy that penetrates into the next layer of the envelope. The bottom of the envelope skin 38 will receive no coating thus remaining the inherent or natural color of the material. Therefore the uncoated clear bottom 214 will have a higher absorption and emission rate compared to the top thus promoting the absorption of albedo reflected energy 36 radiated from the earth FIG. 2. The interior layers may vary in their composition but will probably consist of any number of helium barriers and fiber meshes for strength combined with special layers as required for the airship design and application. The innermost layer is the inner reflective layer 210 that covers the entire inside of the envelope and may be an aluminized plastic film whose purpose is to reflect the heat back into the envelope. These passive measures, in combination with the thermal blankets, will reduce the amount of heat built up during the day as much as 50%.

The passive system also operates at night to take advantage of the albedo flux at night when vast amounts of energy are radiated from the air into space. The novel cyclical thermal management system allows reflected nighttime albedo flux energy 50 to be absorbed through uncoated clear bottom 214 (FIG. 1) which is disposed between ends 216 and 218 (FIG. 11) adjacent to the differentially inflatable thermal blanket 200 of novel high altitude platform 40. The passive elements of skin materials, coatings and emissivity and absorptivity characteristics cooperate with the active system to reduce the amount of heat manipulations and transfers required of the active cyclical thermal management system.

The diurnal heating cycle and nocturnal cooling cycle are highly predictable and fairly uniform in the stratosphere. These seasonal variations can be accounted for in the operation of the novel cyclical thermal management system in the stratosphere. These seasonal variations are so predictable that they could be controlled by a simple clock programmed for seasonal variation, by the sun itself by the sunrise and sunset or operated from the ground or started and stopped by a computer utilizing information received by temperature sensors 207, 219 (FIG. 10) or pressure sensor 180 or a combination of time, temperature and pressure control systems for starting and stopping the heating and cooling cycles of the novel cyclical thermal management system.

Figure 21:
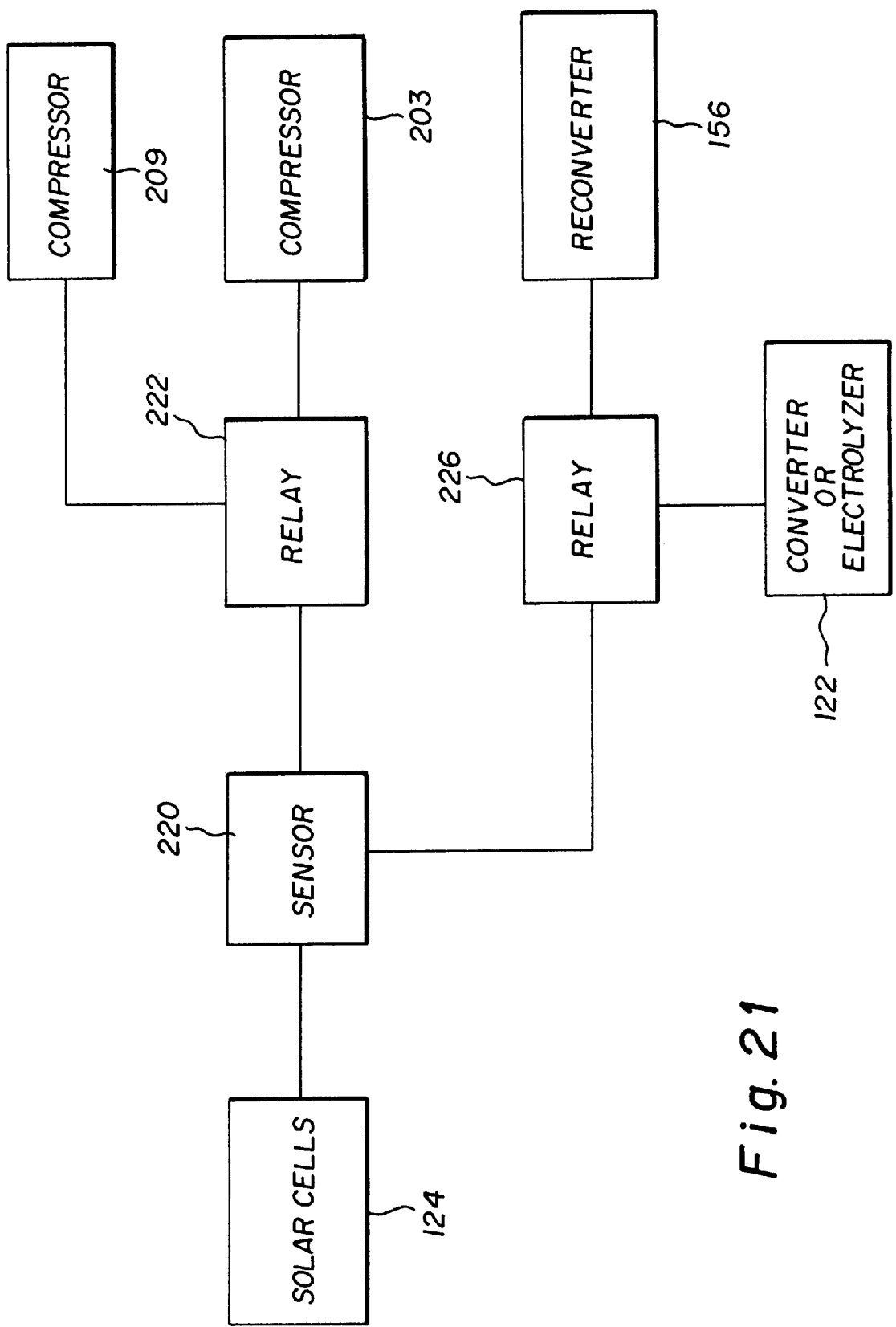
FIG. 21 is a flow chart illustrating a mode of operation of the novel cyclical thermal management system in accordance with an alternative embodiment of the invention.

Referring now to FIG. 21 a system for starting and stopping the cyclical thermal management heating and cooling chemical and physical processes is illustrated utilizing the daily solar cycle. As soon as sensor 220 senses electricity beginning to flow from the solar cells 124 that indicates the sun is rising and the relay 222 activates the compressor 203 on the dark side 204 of the envelope to deflate the thermal blanket 200 on that side. This allows as much heat as possible to be radiated out into space and convected out into the cold atmosphere. Sensor 220 also activates a second relay 226 that deactivates reconverter 156 to stop the exothermic cyclical heating system. Relay 226 activates the converter or electrolyzer 122 after first allowing latent heat to be absorbed by the ice through the melting process and sensible heat to be absorbed by the hydrogen containing heat or energy storage material.

As the sun travels through the sky, or if the airship turns to face a wind change, the solar energy conversion devices on the other side begin generating electricity and sensor 220 instructs the compressor 203 to deflate the now cold side 202 and causes compressor 209 to inflate the now hot side 204. As long as sensor 220 is sensing solar cells 124 are producing electricity relay 222 continues to activate compressor 203 and 209 as needed. When sensor 220 determines solar cells 124 are no longer producing electricity the sun has set and sensor 220 activates relay 222 to completely inflate thermal blanket 200 by activating both compressor 203 and 209 to retain heat in lifting gas 46. Sensor 220 also activates relay 226 to deactivate electrolyzer 122 to stop the cyclical process and initiate physical and chemical exothermic processes to begin heating lifting gas 46. Relay 226 then activates reconverter 156 to begin the cyclical exothermic heating process by activating reconverter 156 to maintain a constant pressure of the lifting gas 46 to maintain a geostatic position.

Figure 22:
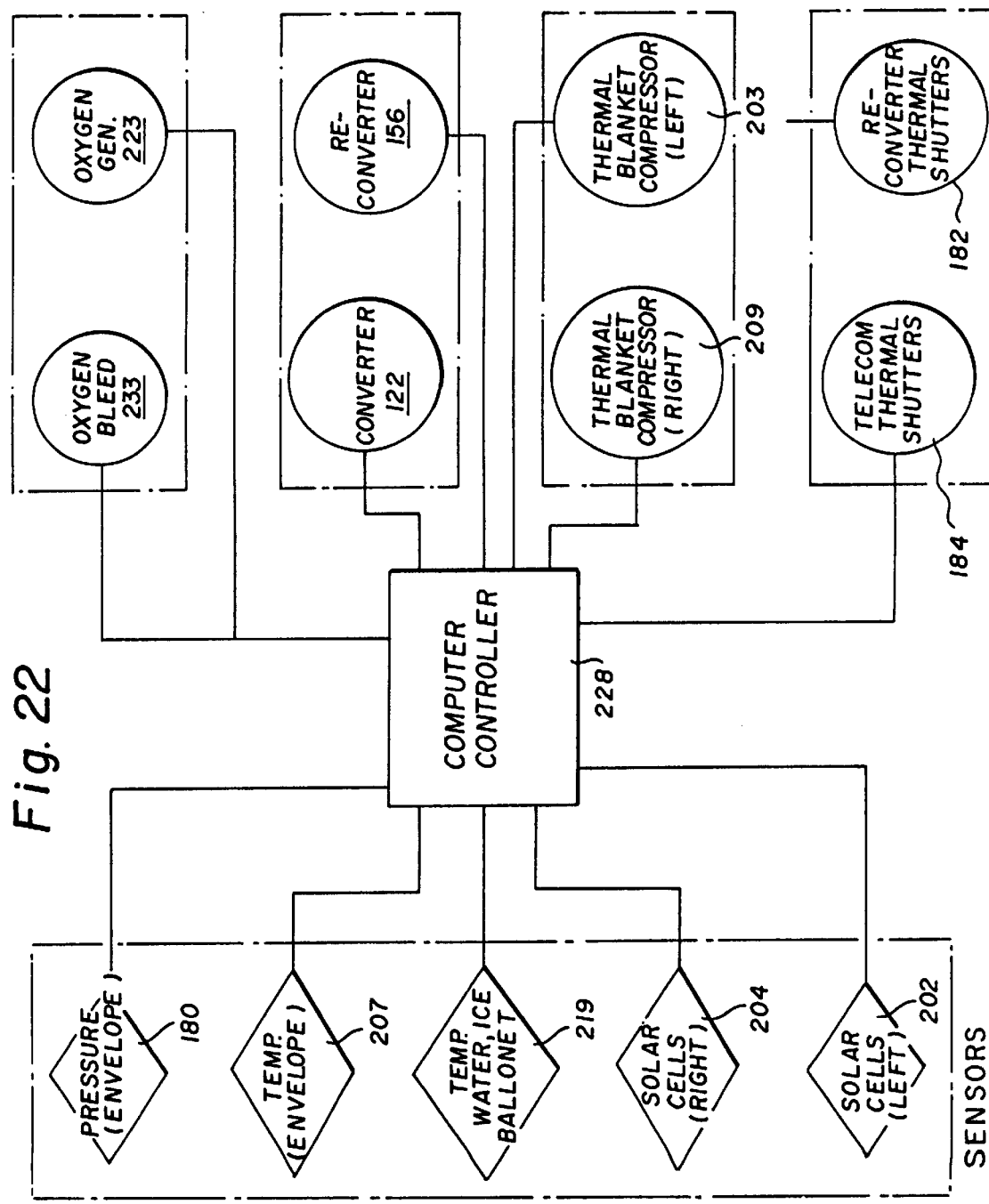
FIG. 22 is a flow chart illustrating the operation of the novel cyclical thermal management system in accordance with the best mode of the invention.

Referring now to FIG. 22 the best mode for controlling the novel cyclical thermal management system is illustrated utilizing a computer controller 228 which receives inputs from solar cells 124 on the left side 202 and the right side 204 of novel high altitude platform 40 as well as the pressure sensor 180, temperature sensor 207 of the envelope and temperature of the vapor, water and ice ballonet 128. From these inputs computer controller 228 determines whether it is night or day and then opens or closes shutters 182 and louvers 184. The computer controller 228, also based upon the inputs, operates compressors 203, 209 or both compressors 203 and 209. The computer controller 228 also operates either electrolyzer 122 (converter) or reconverter 156. Computer controller 228 based on these inputs plus stored inputs and comparison inputs (not shown) can determine the time of the year on curve 215 (FIG. 20) and open valve 233 (FIG. 10) to provide a venting through vent 229 of oxygen gas 136 or an oxygen bleed or activate oxygen generator 223 to acquire oxygen and operate the novel thermal management system of the invention.

Those skilled in the art will recognize the novel thermal management system can be implemented in a number of ways to suit particular missions and provide stability and long duration applications. It will be recognized that novel high altitude platforms, airships and lighter-than-air or slightly lighter-than-air vehicles utilizing a lifting gas can be launched with a variety of lifting gases with hydrogen and a hydrogen containing heat storage material to obtain the advantages of the invention. It will be recognized that such high altitude platforms can be launched with no water and no oxygen since oxygen can be acquired in the stratosphere and water formed in the stratosphere using excess hydrogen lifting gas or hydrogen from a hydrogen containing heat storage material after the acquisition of oxygen from the stratosphere after launch.

The invention may also be modified by those skilled in the art by utilizing other methods for starting and stopping the novel cyclical thermal heating and cooling processes to maintain a geostatic position. Altitude and pitch attitude can also be regulated daily and seasonally by the cyclical thermal management system to maintain a desired altitude range or change altitude in the stratosphere by allowing the novel high altitude platform to ascend or descend in a flat level attitude. The novel cyclical thermal system may be controlled and monitored from the ground or controlled automatically by temperature, pressure, time and solar cycles or combinations thereof to maintain novel high altitude platforms in a geostatic position for long durations.

Those skilled in the art will recognize that many modifications can be made in the passive system such as in the selection and utilizations of different materials for layers of the envelope, types and numbers of reflective coatings and the substitution of thermionic cells for solar cells or utilization of both and the elimination of the uncoated bottom to not take advantage of the albedo flux as a result in variations and mission requirements or to practice the novel cyclical thermal management system with greater predictability of the duration and amount of energy recoverable in various cyclical heat and storage cycles. These and other variations may be made to the passive system by those skilled in the art in view of the duration of the mission, purpose and geostatic position above the earth the high altitude platform is maintained.

It will also be recognized by those skilled in the art that numerous modifications may be made to the type of propulsion system so that methane, hydrogen or hydrocarbon burning engines and turbine engines may be substituted for the electrical engines of the preferred embodiment. These changes may be made and the invention may be implemented with a variety of means of propulsion depending upon the application of the invention, content of the lifting gas, duration, mission and catalysts used in the novel cyclical thermal management system of the invention so that part of or excess of the lifting gas, ballast or processed components of the lifting gas or ballast may be used as fuel depending on duration of the mission requirements of the mission and objectives.

Those skilled in the art will recognize that a wide variety of modifications may be made in the selection of materials in implementing the novel cyclical thermal management system and that a variety of reversible physical and chemical and thermochemical or reversible energy storage systems can be employed and that latent heat, sensible heat and other enthalpy controlled physical and chemical reactions can be utilized to provide to provide heat at night and cooling and other heat mitigating processes such as radiation or convection during the day to maintain a geostatic position for high altitude platforms constructed in accordance with the invention. These modifications may be made alone or together with multilayered envelope design airship configuration and other systems that take advantage of the management of heat to control altitude and pitch attitude of the long duration platform.

As discussed the novel cyclical thermal management system and applications of the novel cyclical thermal management system may be modified in various ways by those skilled in the art and design and substitutions may be made by those skilled in the art to implement the invention in a variety of applications and embodiments. It will be appreciated that these and other modifications can be made within the scope of the invention as defined in the following claims.

What is claimed is:

1. A system for maintaining altitude and pitch stability for a high altitude platform comprising:

(a) a high altitude platform containing a lifting gas;

(b) a telecommunications assembly;

(c) thermal shutters disposed between said telecommunications assembly and said lifting gas;

(d) a cyclical system for periodically heating said lifting gas by processing a recyclable energy containing material in a fuel cell to provide heat together with heat from said telecommunications assembly to increase the buoyancy of said lifting gas and employing stored water and ice produced by said fuel cell to periodically cool said lifting gas to decrease the buoyancy of said lifting gas in response to cyclical diurnal heating and nocturnal cooling; and (e) a solar energy system for obtaining solar energy to operate said cyclical system.

2. The system of claim 1 further comprising an oxygen generator.

3. The system of claim 1 wherein said lifting gas is a combination of helium and hydrogen gas.

4. The system of claim 3 wherein said recyclable energy containing storage material is a hydrogen containing compound.

5. The system of claim 1 wherein a portion of said heating and cooling is provided by a desiccant regeneration cycle.

6. The system of claim 1 wherein said recyclable energy containing storage material is hydrated salts.

7. The system of claim 1 wherein said recyclable energy containing storage material is ammoniated salts.

8. The system of claim 1 wherein said recyclable energy containing storage material is methanolated salts.

9. The system of claim 1 wherein said recyclable energy containing storage material is hydrogenated metals.

10. The system of claim 1 wherein said recyclable energy containing storage material is hydrated zeolites.

11. The system of claim 1 wherein said recyclable energy containing storage material is eutectic salts.

12. The system of claim 1 wherein said recyclable energy containing storage material is water.

13. The system of claim 1 wherein said recyclable energy containing storage material is methanol.

14. The system of claim 1 further comprising a passive system for reducing the volume of said recyclable energy containing storage material processed by said cyclical system necessary for periodically heating and cooling said lifting gas.

15. The system of claim 14 wherein said passive system is a function of the convective and radiative properties of the components of said high altitude platform.

16. The system of claim 15 wherein said passive system is a function of the thermal properties of the skin material of said high altitude platform.

17. The system of claim 16 wherein said thermal properties of said skin material includes a skin material having an $\alpha$ absorptivity from about 0.05 to 0.2 and an $\epsilon$ emissivity of from about 0.7 to 0.97.

18. The system of claim 17 wherein said skin material of said high altitude platform includes a white coating.

19. The system of claim 18 wherein said white coating has an $\alpha$ absorptivity of about 0.05 to 0.20.

20. The system of claim 18 wherein said white coating has an $\epsilon$ emissivity of about 0.7 to 0.97.

21. The system of claim 20 wherein said white coating is composed of titanium oxide.

22. The system of claim 18 wherein said skin material of the lower surface of said high altitude platform is translucent.

23. The system of claim 22 wherein said translucent skin material has an $\alpha$ absorptivity of about 0.6 to 0.9.

24. The system of claim 22 wherein said translucent skin material has an ε emissivity of about 0.5 to 0.7.

25. The system of claim 24 wherein said skin material is composed of a mixture of polymers.

26. The system of claim 1 wherein said solar energy system employs solar cells.

27. The system of claim 1 wherein said solar energy system employs thermionic cells.

28. The system of claim 1 further comprising louvers disposed between said telecommunications assembly and the ambient atmosphere.

29. The system of claim 1 further comprising circulation means for circulating said lifting gas.

30. The system of claim 1 wherein said fuel cell is a proton exchange membrane fuel cell.

31. The system of claim 1 wherein said recyclable energy containing storage material includes hydrogen and a portion of said hydrogen is periodically utilized to augment said lifting gas in response to seasonal cyclical heating and cooling.

32. The system of claim 31 wherein said multilayered skin material is selectively inflatable.

33. The system of claim 14 wherein said passive system is a multilayered skin material.

34. An altitude and pitch stability system for a high altitude platform comprising:
   (a) a high altitude platform containing a lifting gas;
   (b) a ballast in the form of a hydrogen containing energy storage material;
   (c) a cyclical system for a periodic processing of said ballast to provide for the heating and cooling of said lifting gas as a result of the volume of ballast processed to control altitude in response to cyclical heating and cooling; and
   (d) a solar energy system for obtaining solar energy to operate said cyclical system to process said ballast.

35. The altitude and pitch stability system of claim 34 wherein said periodic processing of said ballast further includes the periodic removal of hydrogen from said ballast to supplement the buoyancy of said lifting gas.

36. The altitude and pitch stability system of claim 34 wherein said hydrogen containing storage material includes oxygen.

37. The altitude and pitch stability system of claim 36 wherein said ballast in the form of a hydrogen containing energy storage material is water.

38. The altitude and pitch stability system of claim 37 wherein said periodic processing of said water provides for the seasonal supplementation of the lifting gas by supplementing said lifting gas with hydrogen.

39. The altitude and pitch stability system of claim 37 wherein said heating is provided by a fuel cell.

40. The altitude and pitch stability system of claim 34 wherein a portion of said heating is provided by an electronic telecommunications assembly.

41. The altitude and pitch stability system of claim 40 wherein said electronics telecommunications assembly includes thermal shutters.

42. The altitude and pitch stability system of claim 34 further comprising an oxygen generator.

43. The altitude and pitch stability system of claim 34 wherein said lifting gas is helium.

44. The altitude and pitch stability system of claim 34 wherein said hydrogen containing energy storage material is methanol.

45. The altitude and pitch stability system of claim 34 further comprising a passive system for reducing the volume of ballast processed by said cyclical system necessary to heat and cool said lifting gas to control the buoyancy of said lifting gas.

46. The altitude and pitch stability system of claim 45 wherein said passive system is a function of the convective and radiative properties of the components of said high altitude platform.

47. The altitude and pitch stability system of claim 46 wherein said passive system is a function of the thermal properties of the skin material of said high altitude platform.

48. The altitude and pitch stability system of claim 47 wherein said thermal properties of said skin material includes a skin material having an α absorptivity from about 0.05 to 0.2 and an ε emissivity of from about 0.7 to 0.97.

49. The altitude and pitch stability system of claim 48 wherein said skin material of said high altitude platform includes a white coating.

50. The altitude and pitch stability system of claim 49 wherein said white coating has an α absorptivity of about 0.05 to 0.20.

51. The altitude and pitch stability system of claim 49 wherein said white coating has an ε emissivity of about 0.7 to 0.97.

52. The altitude and pitch stability system of claim 51 wherein said white coating is composed of titanium oxide.

53. The altitude and pitch stability system of claim 49 wherein said skin material of the lower surface of said high altitude platform is translucent.

54. The altitude and pitch stability system of claim 53 wherein said translucent skin material has an α absorptivity of about 0.6 to 0.9.

55. The altitude and pitch stability system of claim 53 wherein said translucent skin material has an ε emissivity of about 0.5 to 0.7.

56. The altitude and pitch stability system of claim 55 wherein said skin material is composed of a mixture of polymers.

57. The altitude and pitch stability system of claim 34 wherein said solar energy system employs solar cells.

58. The altitude and pitch stability system of claim 34 wherein said solar energy system employs thermionic cells.

59. A system for maintaining altitude and pitch stability for a high altitude platform comprising:
   (a) a high altitude platform having an envelope containing a helium lifting gas;
   (b) a ballast ballonet containing a recyclable hydrogen containing storage material;
   (c) a hydrogen storage ballonet;
   (d) a first cyclical system for increasing and decreasing the buoyancy of said helium lifting gas by heating and cooling said lifting gas in response to cyclical diurnal heating and nocturnal cooling by processing said recyclable hydrogen containing storage material;
   (e) a second cyclical system for increasing and decreasing the buoyancy of said lifting gas by changing the volume of hydrogen stored in said hydrogen storage ballonet in response to cyclical seasonal heating and cooling; and
   (f) a solar energy system for obtaining solar energy to operate said first cyclical system and said second cyclical system.

60. The system of claim 59 wherein said second cyclical system provides for the venting of a non-hydrogen portion of said hydrogen containing storage material.

61. The system of claim 60 wherein said venting of said non-hydrogen portion is oxygen.

62. The system of claim 61 further comprising an oxygen generator.

63. The system of claim 62 wherein said hydrogen containing storage material is water.

64. An altitude and pitch stability system for a high altitude platform comprising:
(a) a high altitude platform having an envelope containing a helium lifting gas;
(b) a hydrogen storage ballonet disposed in said envelope;
(c) an oxygen storage ballonet disposed in said envelope;
(d) a water and ice storage ballonet disposed in said envelope;
(e) a cyclical system having a fuel cell for heating said helium lifting gas at night and producing water for storage in said water and ice ballonet to utilize said water in said water and ice ballonet for cooling said helium lifting gas during the day and an electrolyzer to convert said water into hydrogen for storage in said hydrogen ballonet and into oxygen for storage in said oxygen ballonet; and
(f) a solar energy system for obtaining solar energy to operate said cyclical system.

65. The altitude and pitch system of claim 64 wherein said hydrogen storage ballonet is disposed above the center of gravity of said envelope.

66. The altitude and pitch system of claim 65 wherein said water and ice storage ballonet is disposed below the center of gravity of said envelope.

67. The altitude and pitch system of claim 66 wherein said oxygen storage ballonet is disposed below the center of gravity of said envelope.

68. The altitude and pitch system of claim 67 wherein said oxygen storage ballonet includes a vent for venting excess stored oxygen in response to seasonal heating and cooling cycles.

69. The altitude and pitch system of claim 68 further comprising an oxygen generator.

70. The altitude and pitch system of claim 67 wherein a portion of said heating is provided by an electronic telecommunications assembly.

71. The altitude and pitch system of claim 67 wherein said electronics telecommunications assembly includes thermal shutters.

72. The altitude and pitch system of claim 67 further comprising a passive system for reducing the volume of hydrogen, oxygen and water processed by said cyclical system.

73. The altitude and pitch system of claim 72 wherein said passive system is a function of the convective and radiative properties of the components of said high altitude platform.

74. The altitude and pitch system of claim 73 wherein said passive system is a function of the thermal properties of the skin material of said high altitude platform.

75. The altitude and pitch system of claim 73 wherein said skin material of the lower surface of said high altitude platform is translucent.

* * * * *